United States Patent
Ozkan

(10) Patent No.: US 9,906,918 B2
(45) Date of Patent: *Feb. 27, 2018

(54) DETERMINING INDOOR LOCATION OF DEVICES USING REFERENCE POINTS AND SENSORS

(71) Applicant: AT&T Intellectual Property I, L.P., Atlanta, GA (US)

(72) Inventor: Mehmet Ozkan, Allen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/275,665

(22) Filed: Sep. 26, 2016

(65) Prior Publication Data

US 2017/0013414 A1    Jan. 12, 2017

Related U.S. Application Data

(63) Continuation of application No. 14/246,355, filed on Apr. 7, 2014, now Pat. No. 9,456,311.

(51) Int. Cl.
  *H04W 4/04* (2009.01)
  *H04L 29/12* (2006.01)
  *H04W 24/00* (2009.01)

(52) U.S. Cl.
  CPC .......... *H04W 4/04* (2013.01); *H04L 61/6022* (2013.01); *H04W 24/00* (2013.01)

(58) Field of Classification Search
  CPC .................................................... H04W 4/04
  USPC .......................................... 455/456.1–456.6
  See application file for complete search history.

(56) References Cited

U.S. PATENT DOCUMENTS

| | | | |
|---|---|---|---|
| 7,292,187 B2 | 11/2007 | Recker | |
| 8,040,219 B2 | 10/2011 | Haartsen et al. | |
| 8,259,692 B2 | 9/2012 | Bajko | |
| 8,290,511 B2 | 10/2012 | Burdo et al. | |
| 8,396,485 B2 | 3/2013 | Grainger et al. | |
| 2002/0183979 A1 | 12/2002 | Wildman | |
| 2005/0021561 A1* | 1/2005 | Noonan | G06Q 30/06 |

(Continued)

OTHER PUBLICATIONS

U.S. Office Action dated Jul. 30, 2015 in U.S. Appl. No. 14/246,355.
(Continued)

*Primary Examiner* — Michael T Vu
(74) *Attorney, Agent, or Firm* — Hartman & Citrin LLC

(57) ABSTRACT

Concepts and technologies are disclosed herein for determining the indoor location of devices such as smartphones and tablet computers using reference points and sensors. According to one aspect disclosed herein, an environment analytics system can retrieve a layout of an environment and determines an absolute reference point for the layout. The environment analytics system also can determine a coordinate pair for a point associated with an area of the layout. The coordinate pair can be determined relative to the absolute reference point. The environment analytics system also can determine a coordinate pair for a beacon deployed within the area. The coordinate pair can be associated with a unique address of the beacon. The environment analytics system can update beacon data in an environment database to include the coordinate pair for the beacon and the unique address of the beacon.

20 Claims, 31 Drawing Sheets

(56) References Cited

U.S. PATENT DOCUMENTS

| | | |
|---|---|---|
| 2008/0161011 A1 | 7/2008 | Babin et al. |
| 2008/0245863 A1 | 10/2008 | Buchheit |
| 2009/0012704 A1 | 1/2009 | Franco et al. |
| 2010/0106662 A1 | 4/2010 | Ramaswamy |
| 2010/0222038 A1* | 9/2010 | Dragt .................... G06Q 30/02 455/414.1 |
| 2011/0078602 A1 | 3/2011 | Gammon et al. |
| 2012/0258741 A1 | 10/2012 | Tillson et al. |
| 2012/0316953 A1 | 12/2012 | Ramchandani et al. |
| 2012/0323488 A1 | 12/2012 | Callaghan |
| 2013/0065584 A1 | 3/2013 | Lyon et al. |
| 2013/0122941 A1 | 5/2013 | Das et al. |
| 2013/0143603 A1 | 6/2013 | DiAcetis et al. |
| 2013/0225197 A1 | 8/2013 | McGregor et al. |
| 2013/0237243 A1 | 9/2013 | Kuehnel et al. |
| 2013/0260693 A1 | 10/2013 | Un et al. |
| 2013/0310081 A1 | 11/2013 | Chu |
| 2014/0279241 A1 | 9/2014 | Bartholomew |

OTHER PUBLICATIONS

U.S. Office Action dated Feb. 9, 2016 in U.S. Appl. No. 14/246,355.
U.S. Notice of Allowance dated May 18, 2016 in U.S. Appl. No. 14/246,355.

* cited by examiner

| 902 STORE# | 904 SECTION | 906 $X_1$ | 908 $X_2$ | 910 $Y_1$ | 912 $Y_2$ |
|---|---|---|---|---|---|
| 75013 | BUILDER'S HARDWARE | 30 | 38 | 6 | 18 |
| 75013 | TOOLS | 18 | 28 | 6 | 18 |
| 75013 | — | — | — | — | — |

*FIG. 9*

| Unique Address | Beacon Type | X Coordinate | Y Coordinate | Section |
|---|---|---|---|---|
| D4-BE-D9-17-ED-14 | 1 | 7 | 13 | Carbonated Drinks |
| D4-CC-D9-17-ED-01 | 1 | 11 | 13 | Bottled Juices |
| D4-BE-CE-17-ED-AA | 2 | 7 | 8 | Snacks |
| D4-BE-CE-22-ED-12 | 1 | 14 | 17 | Ice Cream |

*FIG. 11*

DETERMINING INDOOR LOCATION OF DEVICES USING REFERENCE POINTS AND SENSORS

CROSS-REFERENCE TO RELATED APPLICATIONS

This application is a continuation of and claims priority to U.S. patent application Ser. No. 14/246,355, filed Apr. 7, 2014, now U.S. Pat. No. 9,456,311, which is incorporated herein by reference in its entirety.

BACKGROUND

Mobile computing devices such as smartphones and tablet computers have become an integral part of many people's lives. Many people use these devices as an aid for researching, comparing and purchasing products online as well as in physical stores. In fact, some reports indicate that up to 84% of smartphone shoppers utilize their smartphones while in a physical store to, among other things, research product specifications, compare prices and read reviews. More specifically, smartphone internet usage in June 2013 totaled 44% of retail internet minutes, up from 17% in 2010; and tablet internet usage accounted for 11% of total internet minutes in retail sites over the same time period.

During the second quarter in 2013, mobile commerce dollars totaled $4.7 billion or 8.6% of total United States electronic commerce dollars that quarter. Additionally, between the second quarter of 2012 and the second quarter of 2013, mobile commerce grew 24%, compared to 16% percent growth in electronic commerce as a whole. This growth trend is likely to continue as more people adopt smartphones and tablet computers.

Companies have noticed the growth trend of mobile commerce and, in response, have invested in smartphone and tablet computer application development to create user experiences for shoppers both in-store and away from store. In the second quarter of 2013, an estimated 57% of smartphone users visited the same company's website or application while in the store, compared to 43% who consulted another company's website or application. The top reason shoppers consulted these websites and applications was to compare prices. Moreover, among the smartphone users who visited the same company's website or application, an estimated 59% wanted to see if there was an online discount available. Similarly, among those who checked a different company's website or application, an estimated 92% did so to see whether they could get a better price. In addition to price comparisons, many smartphone users use their devices while in the store to take a picture of a product, share the picture via multimedia messaging, email and/or social networks, and/or to text or call family or friends to discuss the product.

A typical big box store may contain tens of thousands of products. In order to locate an item, a retail customer needs to browse several aisles of a store, which may be the size of a few football fields. Even in a neighborhood store where the shoppers are likely familiar with the layout, locating a specific product can be a challenging task. The size of the stores also brings challenges for companies. For example, promotional items often go unnoticed by shoppers unless the promotional items are located in a special display, end cap or other prime location of which there is limited availability.

SUMMARY

Concepts and technologies are disclosed herein for determining, recording and analyzing the indoor location of devices such as smartphones and tablet computers using reference points and sensors, such as beacons. According to one aspect disclosed herein, an environment analytics system can include a processor and a memory. The memory can store computer-executable instructions that, when executed by the processor, cause the processor to perform operations. The environment analytics system can retrieve a layout of an environment and determine an absolute reference point for the layout. The environment analytics system also can determine a coordinate pair for a point associated with an area of the layout. The coordinate pair can be determined relative to the absolute reference point.

In some embodiments, the environment analytics system also can determine a coordinate pair for a beacon deployed within the area. The coordinate pair can be associated with a unique address of the beacon, such as, for example, a serial number or a media access control ("MAC") address of the beacon. The environment analytics system can update beacon data in an environment database to include the coordinate pair for the beacon and the unique address of the beacon.

In some embodiments, the environment analytics system also can receive calibration data associated with a user device. The calibration data can include a distance value, a signal strength value, and a unique address of a beacon. The distance value can be calculated by the user device from the signal strength value of a signal sent by the beacon and received by the user device. The distance value can indicate a distance of the user device from the beacon. The environment analytics system also can update the beacon data stored in the environment database to include the calibration data in association with the beacon and a specification of the user device. The beacon data can be useable by a further user device that also has the specification to calculate a location of the further device within the environment.

In some embodiments, the environment analytics system also can apply a coordinate system to the layout of the environment. The coordinate system can include the absolute reference point. The environment analytics system also can determine a minimum coordinate pair, a maximum coordinate pair, a granularity, and a time interval. The environment analytics system also can set a first coordinate equal to a first minimum coordinate of the minimum coordinate pair. The environment analytics system also can set a second coordinate equal to a second minimum coordinate of the minimum coordinate pair. The environment analytics system also can set a third coordinate equal to a sum of the first minimum coordinate and the granularity, and can set a fourth coordinate equal to a sum of the second minimum coordinate and the granularity. The environment analytics system also can query the environment database for a number of unique user location records with a first location coordinate between the first coordinate and the third coordinate, a second location coordinate between the second coordinate and the fourth coordinate, and a timestamp within the time interval. The environment analytics system also can determine heat map color codes for a plurality of different numbers of unique user location records. The environment analytics system also can generate a heat map that includes a plurality of areas representing at least a portion of the heat map color codes.

In some embodiments, the environment analytics system also can query a user coordinates table stored in the environment database for user coordinates associated with users located within the environment during a given time interval. The environment analytics system also can define a section of the layout of the environment to be analyzed. The environment analytics system also can determine user location updates that occur within the section, a time of entry into the section for each user associated with at least one of the user location updates, and a time of exit from the section for each user associated with at least one of the user location updates. The environment analytics system also can determine, based upon the time of entry and the time of exit for each user associated with at least one of the user location updates, a time spent in the section for each user associated with at least one of the user location updates, a time spent in the section for each user. The environment analytics system also can calculate an average time spent by averaging the time spent in the section for each user during the given time interval.

In some embodiments, the environment analytics system also can determine a time interval and borders of a promotional area within the layout. The promotional area can be associated with a plurality of beacons that define the borders the promotional area. The environment analytics system also can query the environment database for a number of unique user location records within the borders of the promotional area and for a number of sales of an item located within the promotional area. The environment analytics system also can calculate a ratio of sales to the number of unique user location records. The environment analytics system can determine, based upon the ratio, a success rate of a promotion associated with the item.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

BRIEF DESCRIPTION OF THE DRAWINGS

FIG. 9 is a table illustrating coordinate assignments for areas within an indoor environment, according to an illustrative embodiment.

FIG. 11 is a table illustrating example beacon data, according to an illustrative embodiment.

DETAILED DESCRIPTION

The following detailed description is directed to determining the indoor location of devices such as smartphones and tablet computers using reference points and sensors, such as beacons. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
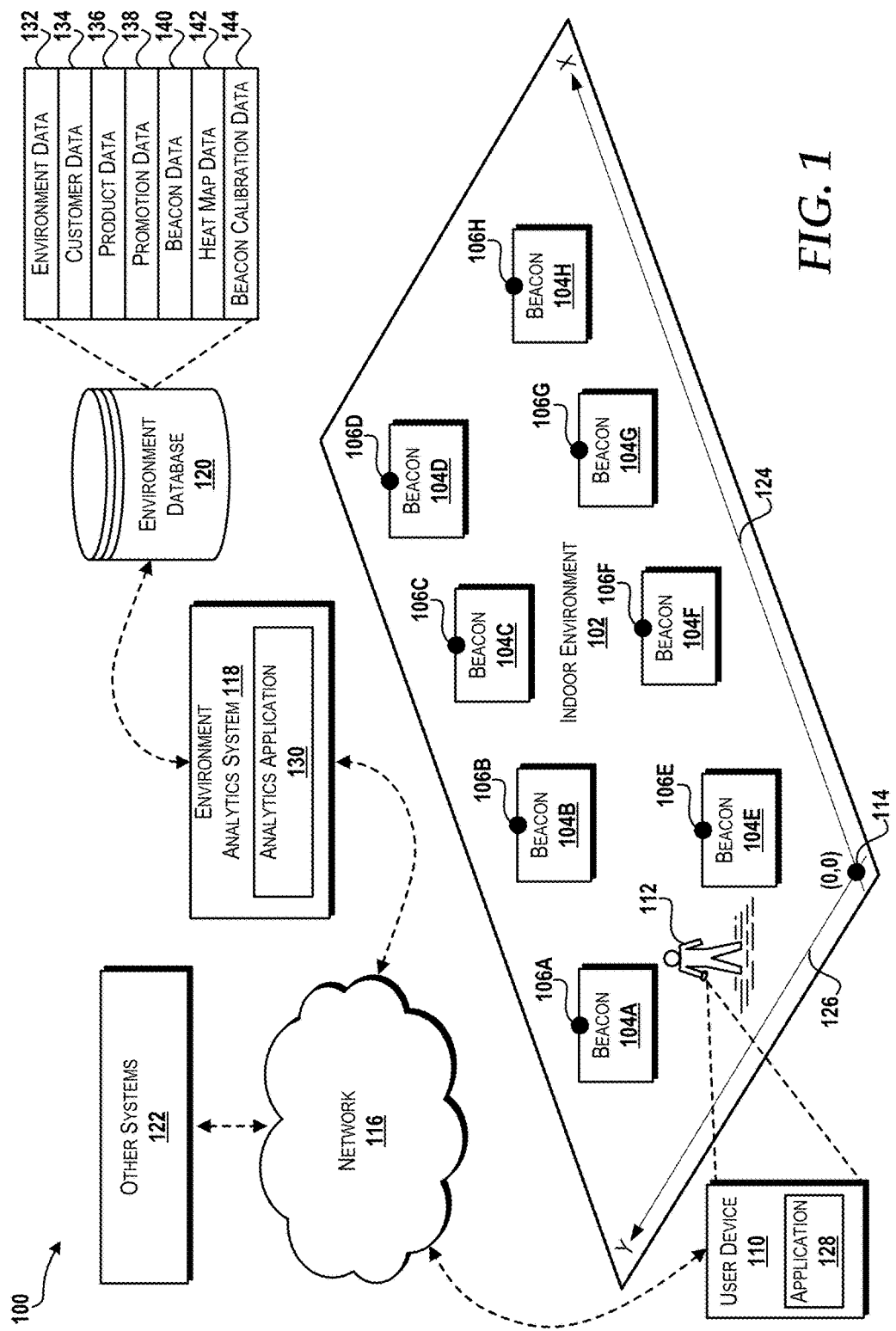
FIG. 1 is a system diagram illustrating an illustrative operating environment for the various embodiments disclosed herein.

Referring now to FIG. 1, aspects of an operating environment 100 for various embodiments of the concepts and technologies disclosed herein for determining the indoor location of devices such as smartphones and tablet computers using reference points and sensors, such as beacons, will be described, according to an illustrative embodiment. The operating environment 100 shown in FIG. 1 includes an indoor environment 102 in which a plurality of beacons 104A-104H are deployed to provide a plurality of reference points 106A-106H that can be utilized by an application 128 executed by a user device 110 associated with a user 112 to determine a location of the user device 110 within the indoor environment 102 with respect to an absolute reference point 114. The user device 110, in the illustrated example, is operating in communication with and/or as part of a communications network ("network") 116 that provides the user device 110 access to an environment analytics system 118, an environment database 120 and one or more other systems 122 so that the user device 110 can obtain data associated with the indoor environment 102 to aid the user 112 in finding products, viewing promotions, navigating the indoor environment 102, and other tasks described herein. In addition the network 116 provides communication between the environment analytics system 118 and the other systems 122 as will be described in detail below.

The indoor environment 102 is described by way of example herein as a store such as a home improvement store or a grocery store. These examples are provided merely to aid in describing the concepts and technologies disclosed herein. It should be understood that the indoor environment 102 may include any environment in which the location determining techniques described herein are utilized, including, but not limited to, general purpose buildings, schools, offices, conference centers, hotels, outdoor environments, stadiums, tents and other temporary structures, houses and other residential environments, parking garages, commercial buildings, and the like.

The plurality of beacons 104A-104H can operate in accordance with any wireless protocol. The user device 110 can receive signals wirelessly from the plurality of beacons 104-104H, can calculate the signal strength of the signals, and can utilize the received signal strength of the signals to calculate the distance of the user device 110 from one or more of the plurality of beacons 104A-104H for use in determining a location of the user device 110 within the indoor environment 102.

In some embodiments, the plurality of beacons 104A-104H utilize BLUETOOTH low energy ("BLE"), also known as BLUETOOTH SMART, which is part of the BLUETOOTH Core Specification Version 4.0 and later, to communicate with the user device 110. The plurality of beacons 104A-104H may be off-the-shelf proximity beacons or implementation-specific beacons developed for use in accordance with the concepts and technologies disclosed herein. The plurality of beacons 104A-104H are representative of the plurality of reference points 106A-106H, respectively, within a coordinate system created by the environment analytics system 118 for the layout of the indoor environment 102. In the illustrated example, the coordinate system created by the environment analytics system 118 includes an X-axis 124 and a Y-axis 126 that each extends from the absolute reference point 114. Each of the plurality of reference points 106A-106H is associated with an ordered pair that includes a value along the X-axis 124 and a value along the Y-axis 126 to provide a location of one of the plurality of beacons 104A-104H within the indoor environment 102.

The user device 110 can be a smartphone, a tablet computer, a wearable device such as a watch or fitness device, or any other device capable of communicating with the plurality of beacons 104A-104H and the network 116. The illustrated user device 110 includes an application 128. The application 128 can be stored in a memory or other storage component (best shown in FIG. 26) of the user device 110 and can be executed by one or more processors (also best shown in FIG. 26) of the user device 110 to perform various operations described herein.

The network 116 can include one or more wireless local area networks ("WLANs"), one or more wireless wide area networks ("WWANS"), one or more wireless metropolitan area networks ("WMANs"), one or more campus area networks ("CANs"), and/or one or more packet data networks (e.g., the Internet). The user device 110 can communicate with the network 116 using any wireless communications technology or combination of wireless communications technologies, some examples of which include, but are not limited to, WI-FI, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like. The user device 110 can communicate with the network 116 via various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data can be exchanged between the user device 110 and the network 116 via cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. It should be understood that the network 116 may additionally include infrastructure that operates on wired communications technologies, including, but not limited to, optical fiber, coaxial cable, twisted pair cable, and the like to transfer data between various systems, such as the environment analytics system 118, the environment database 120, and the other systems 122, operating on or in communication with the network 116. Additional details regarding an illustrative example of the network 116 is illustrated and described with reference to FIG. 28.

The illustrated environment analytics system 118 includes an analytics application 130. The analytics application 130 can be stored in a memory or other storage component (best shown in FIG. 27) of the environment analytics system 118 and can be executed by one or more processors (also best shown in FIG. 27) of the environment analytics system 118 to perform various operations described herein. For example, execution of the analytics application 130 can cause the environment analytics system 118 to interact with the user device 110, the network 116, the environment database 120, and the other systems 122. Some operations performed by the environment analytics system 118 will be described now, and others will become apparent from the description of the other FIGURES.

The environment analytics system 118 can perform operations to interact with the environment database 120, and more particularly, environment data 132, customer data 134, product data 136, promotion data 138, beacon data 140, heat map data 142 and/or calibration data 144 stored within the environment database 120. The environment analytics system 118 can save data to the environment database 120, retrieve data from the environment database 120, delete data from the environment database 120, edit data and save edited data to the environment database 120, and manipulate data stored within the environment database 120. The environment analytics system 118 can provide data retrieved from the environment database 120 to the user device 110 and/or the other systems 122 via the network 116.

The environment data 132 can include data associated with various aspects of the indoor environment 102. For example, the environment data 132 can include dimensions of the indoor environment, a layout of the indoor environment 102, and coordinate pair data defining one or more sections of the layout.

In some embodiments, the layout of the indoor environment 102, a coordinate system, and the absolute reference point 114 can be assigned manually prior to deployment of the plurality of beacons 104A-104H within the indoor environment 102. In these embodiments, one or more users can assign the absolute reference point 114 within the layout of the indoor environment 102 and can measure the distance of other reference points, such as the plurality of reference points 106A-106H, from the absolute reference point 114.

In some other embodiments, the layout of the indoor environment 102, a coordinate system, and the absolute reference point 114 can be assigned by one or more software applications executed by one or more of the other systems 122, the environment analytics system 118 (e.g., the analytics application 130 and/or another application), and/or one or more computing systems or device (not shown). In these embodiments, the software application(s) can assign the absolute reference point 114 within the layout of the indoor environment 102 and can measure the distance of other reference points, such as the plurality of reference points 106A-106H, from the absolute reference point 114.

In some embodiments, after the layout of the indoor environment 102, a coordinate system, and the absolute reference point 114 are assigned, the layout of the indoor environment 102 including the coordinate system, the absolute reference point 114 and the plurality of reference points 106A-106H can be provided to the environment analytics system 118 so that the analytics application 130 can be executed by one or more processors of the environment analytics system 118 to provide to one or more user devices, such as the user device 110, the layout with the absolute reference point 114 and the plurality of reference points 106A-106H applied.

The customer data 134 can include data associated with one or more customers, such as the user 112. For example, the customer data 134 can include identity data such name, birth date, gender, one or more physical addresses, one or more telephone numbers, one or more email addresses, social network information, customer account information including account identifiers and/or user identifiers, and/or job information. The customer data 134 can additionally or alternatively include quantitative data, such as, for example, transactional information such as the number of products purchased, details regarding the products purchases, value of products purchased, and product return history; communication information such as communication date, communication channel (e.g., telephone, email or social network) and communication subject; online activity such as website visits, product views, online registration information, and social network activity including posts, likes, and other social network interactions; and customer service information such as customer complaint details and customer inquiry details. The customer data 134 can additionally or alternatively include descriptive data, such as, for example, marital status, number of children, age of children, property type, car type, number of car doors, number and type of pets, annual income, profession, education level, and the like. The customer data 134 can additionally or alternatively include qualitative data, such as, for example, attitudinal information regarding how customers rate customer service, the value of a product, and the likelihood of purchasing a product again; opinion information regarding customer's favorite colors, favorite vacation locations, and other personal opinions; and motional information regarding why a product was purchased (e.g., personal use, business use or as a gift), one or more reasons for purchasing a product (e.g., locality, brand, price, and/or quality). The customer data also can include permission and suppression preferences. It should be understood that the customer data 134 can include any combination of the aforementioned data and other data associated with customer that is not specified herein.

The product data 136 can include data associated with one or more products available for purchase within the indoor environment 102. The product data 136 can include, for example, category, title, description, image, uniform resource locator ("URL") for corresponding web page on a website associated with the indoor environment 102, stock keeping unit ("SKU"), universal product code ("UPC"), shelf-life, wholesale price, retail price, location within the indoor environment (e.g., coordinates and section, shelf location, and/or shelf name) 102, quantity-on-hand, quantity-on-order, and backorder status. It should be understood that the product data 134 can include any combination of the aforementioned data and other data associated with products that is not specified herein.

The promotion data 138 can include data associated with one or more promotions being offered by the indoor environment 102. The promotion data 138 can include identifiers to identify products for which data is stored as part of the product data 136, promotion category, promotion title, promotion description, promotion price, promotion location coordinates within the indoor environment 102, promotion restrictions, and promotion expiration date. It should be understood that the promotion data 138 can include any combination of the aforementioned data and other data associated with products that is not specified herein.

The beacon data 140 can include data associated with the plurality of beacons 104A-104H. The beacon data 140 can include, for example, beacon technology type (e.g., BLE, infrared, near field communications, or other short-range wireless communications technology), beacon location coordinates within the indoor environment 102, unique identifier for each beacon, beacon section within the indoor environment 102 (e.g., produce, dairy, frozen, or the like in a grocery store), and beacon calibration data. It should be understood that the beacon data 140 can include any combination of the aforementioned data and other data associated with beacons that is not specified herein.

The heat map data 142 can include data associated with customer heat maps. Customer heat maps are used herein to identify hot spots, dead areas and bottlenecks of customer traffic within the indoor environment 102. Customer heat maps can aid companies to optimize store performance, to improve customer service and to improve marketing and promotion results. Companies can use heat maps to visualize the impact of changes to the indoor environment in terms of customer flows, sold items, average sales values, and the like. The heat map data 142 can include previously recorded customer coordinate during a given time interval and/or real-time customer coordinate information. It should be understood that the heat map data 142 can include any combination of the aforementioned data and other data associated with heat maps that is not specified herein.

The beacon calibration data 144 can include data associated with the calibration of one or more of the plurality of beacons 104A-104H. During a calibration process, the received signal strength of each beacon of the plurality of beacons 104A-104H can be measured by a plurality of user devices having different hardware, software, and/or firmware components and specifications, since the received signal strength might differ for different beacon and user device pairs. Moreover, the plurality of beacons 104A-104H may include different beacon models having different hardware, software, and/or firmware that may affect the radio characteristics of a given beacon/user device pair. Each beacon model received signal strength can be measured at different distances for each different user device model, such as a set of the most popular user devices available. The beacon calibration data 144 therefore can include expected received signal strength indicator ("RSSI") values measured for different distances for each user device model and beacon pair used during the calibration process.

In some embodiments, each beacon to be used in a deployment within the indoor environment 102 is calibrated prior to the deployment. In some other embodiments, each beacon is calibrated after deployment within the indoor environment 102. In some other embodiments, one or more beacons are re-calibrated after deployment within the indoor environment 102. In some other embodiments, user devices that have not been used during a calibration process can measure RSSI for different distances from one or more of the plurality of beacons 104A-104H and the beacon calibration data 144 stored within the environment database 120 can be updated accordingly. In this manner, as new user devices come to market after initial deployment and are used within the indoor environment 102, the beacon calibration data 144 can be updated.

It is contemplated that the environment database 120 can store other data that does not fall into one or more of the aforementioned data categories. As such, the inclusion of the aforementioned data categories in the environment database 120 should not be construed as being limiting in any way.

The other systems 122 can include customer relationship management ("CRM") systems. CRM systems can include one or more physical or virtualized computing systems that execute one or more CRM software applications, such CRM software applications available from MICROSOFT CORPORATION, SAP AG, ORACLE, SALESFORCE.COM, and others. CRM systems can be provided in accordance with a software-as-a-service ("SaaS") model or other computing model.

The other systems 122 can additionally or alternatively include enterprise resource planning ("ERP") systems. The ERP systems can include one or more physical or virtualized computing systems that execute one or more ERP software applications, such ERP software applications available from MICROSOFT CORPORATION, SAP AG, ORACLE, SALESFORCE.COM, and others. The other systems 122 can additionally or alternatively include marketing systems.

In some embodiments, the other systems 122 include one or more corporate systems that communicate with the environment analytics system 118, which is responsible for performing analytics for the indoor environment 102. In some other embodiments, the other systems 122 communicate with the environment analytics system 118, which is responsible for performing analytics for the indoor environment 102 and one or more other environments (not shown). In some embodiments, the environment analytics system 118 and/or one or more of the other systems 122 are provided by a telecommunications service provider.

According to various embodiments, the functionality of the environment analytics system 118 may be provided by one or more server computers, desktop computers, mobile devices, laptop computers, set-top boxes, other computing systems, cloud computing systems, and the like. It should be understood that the functionality of the environment analytics system 118 can be provided by a single device, by two similar devices, and/or by two or more dissimilar devices. For purposes of describing the concepts and technologies disclosed herein, the environment analytics system 118 is described herein as a single computer system. It should be understood that this embodiment is illustrative, and should not be construed as being limiting in any way.

FIG. 1 illustrates one user device 110, one application 128, one network 116, one environment analytics system 118, one analytics application 130, and one environment database 120. It should be understood, however, that various implementations of the operating environment 100 include multiple user devices 110, multiple applications 128, multiple networks 116, multiple environment analytics systems 118, multiple analytics applications 130, and environment databases 120. As such, the illustrated embodiment should be understood as being illustrative, and should not be construed as being limiting in any way.

Figure 2:
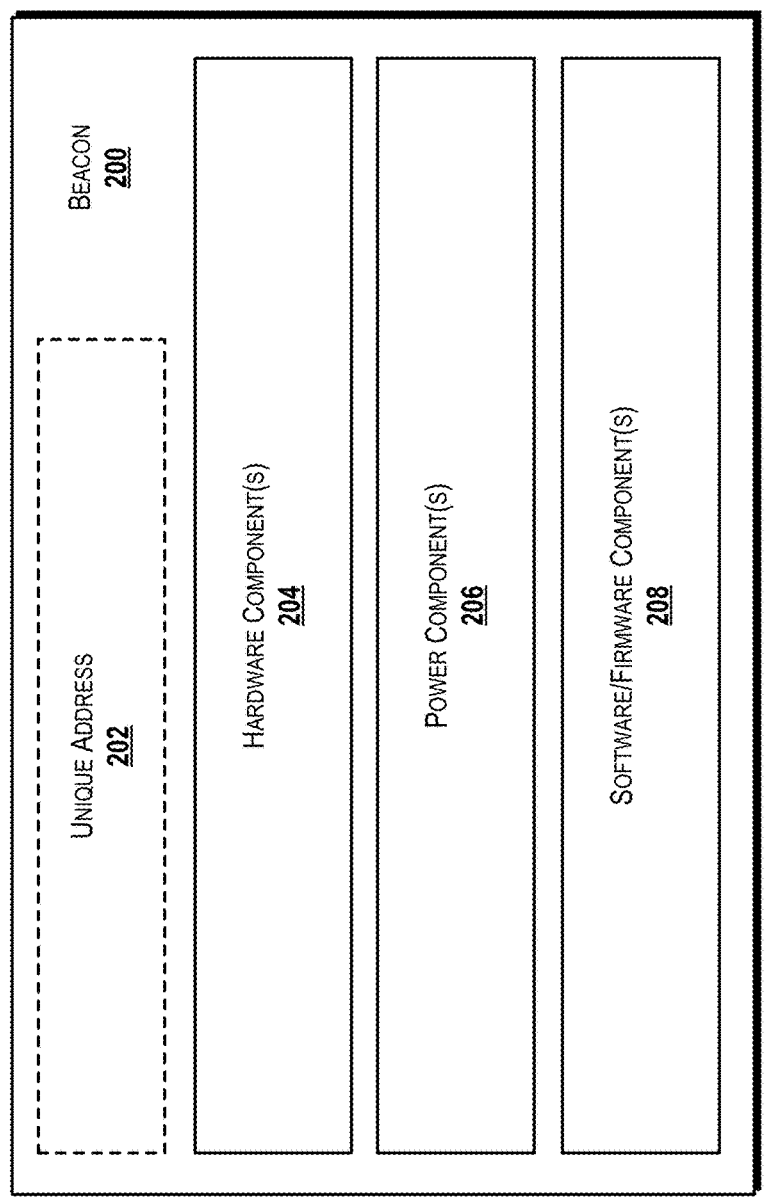
FIG. 2 is a block diagram illustrating a beacon and components thereof, according to an illustrative embodiment.

Turning now to FIG. 2, a block diagram illustrating an example beacon 200 and components thereof will be described, according to an illustrative embodiment. Each of the plurality of beacons 104A-104H described with reference to FIG. 1 can be configured with components as now described with reference to the beacon 200 of FIG. 2, although it is contemplated that modifications may be made to the beacon 200 to accommodate certain implementation details. It should be understood that the beacon 200 may or may not include the functionality described herein with reference to FIG. 2. While connections are not shown between the various components illustrated in FIG. 2, it should be understood that some, none, or all of the components illustrated in FIG. 2 can be configured to interact with one other to carry out various beacon functions. In some embodiments, the components are arranged so as to communicate via one or more busses (not shown). Thus, it should be understood that FIG. 2 and the following description are intended to provide a general understanding of a suitable beacon architecture in which various aspects of embodiments can be implemented, and should not be construed as being limiting in any way.

The illustrated beacon 200 is associated with a unique address 202. The unique address 202 can be any identifier that uniquely identifies the beacon 200, including, for example, a universally unique identifier ("UUID") or a media access control ("MAC") address. The unique address 202 for the beacon 200 can be stored in the environment database 120 (shown in FIG. 1) as part of the beacon data 140 (also shown in FIG. 1).

The illustrated beacon 200 includes one or more hardware components 204 that enable the beacon 200 to communicate with devices such as the user device 110 (shown in FIG. 1). In some embodiments, the hardware component 204 includes a single module that contains a BLE radio, microcontroller, and solid-state memory. In some other embodiments, the hardware components 204 include multiple modules that collectively contain a BLE radio, microcontroller, and solid-state memory.

The illustrated beacon 200 also includes one or more power components 206. The power component(s) 206 can include a battery (e.g., a coin-sized battery or other low wattage battery) for powering the hardware component(s) 204. The power components(s) 206 also include solar panels, vibration sensors or other components capable of recharging the battery. The power component(s) can additionally or alternatively include a plug suitable for connection to a continuous power source such as, for example, an alternating current ("AC") power supply.

The illustrated beacon 200 also includes one or more software and/or firmware components 208 that can be executed by the hardware components 204 to perform various operations described herein. The software and/or firmware components 208 can include a BLE software stack, BLUETOOTH profile details, security configuration, and updateable firmware.

Figure 3A:
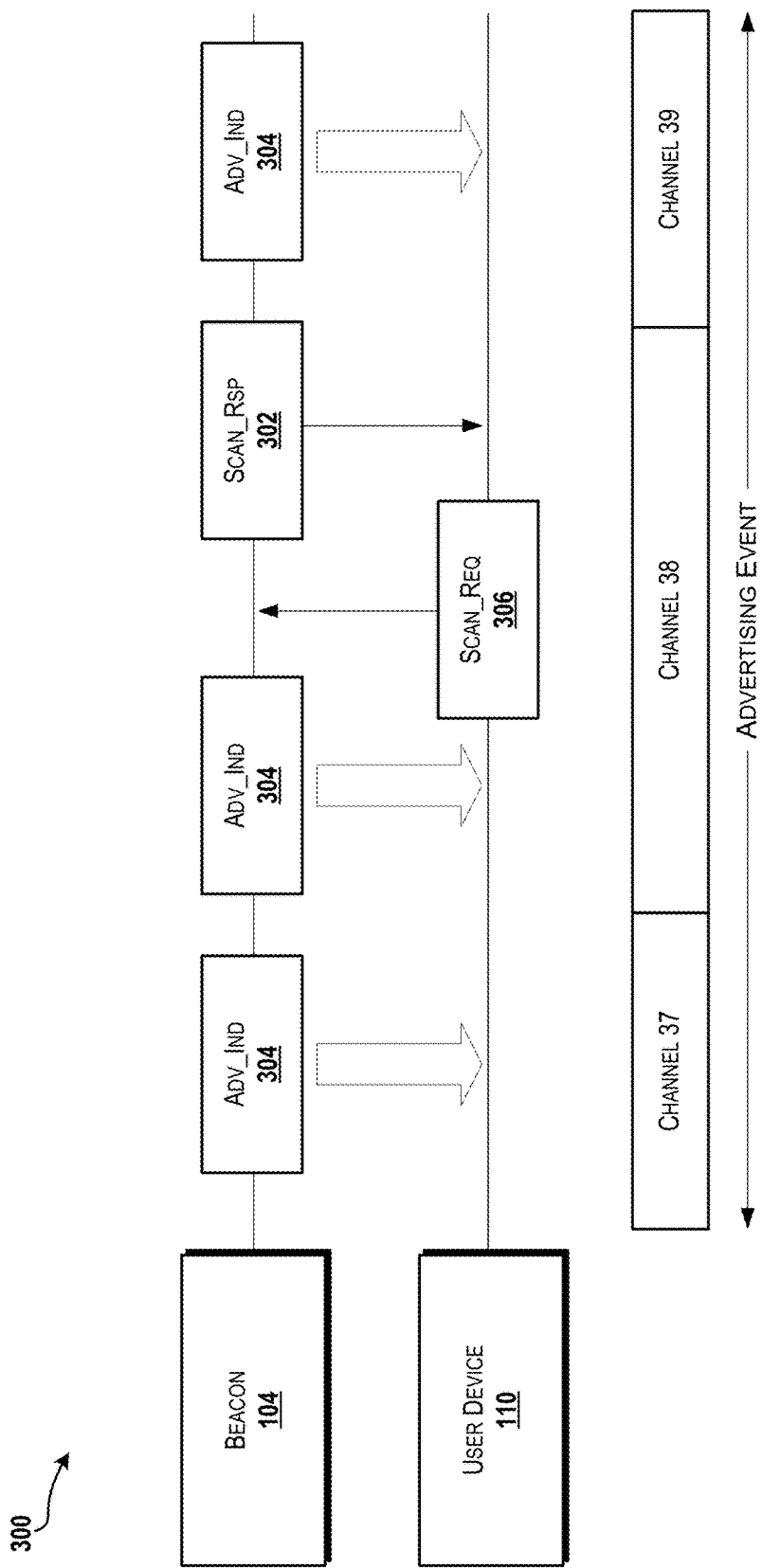
FIGS. 3A-3B are block diagrams illustrating aspects of beacon advertisement, beacon discovery and beacon connection, according to illustrative embodiments.
Figure 3B:
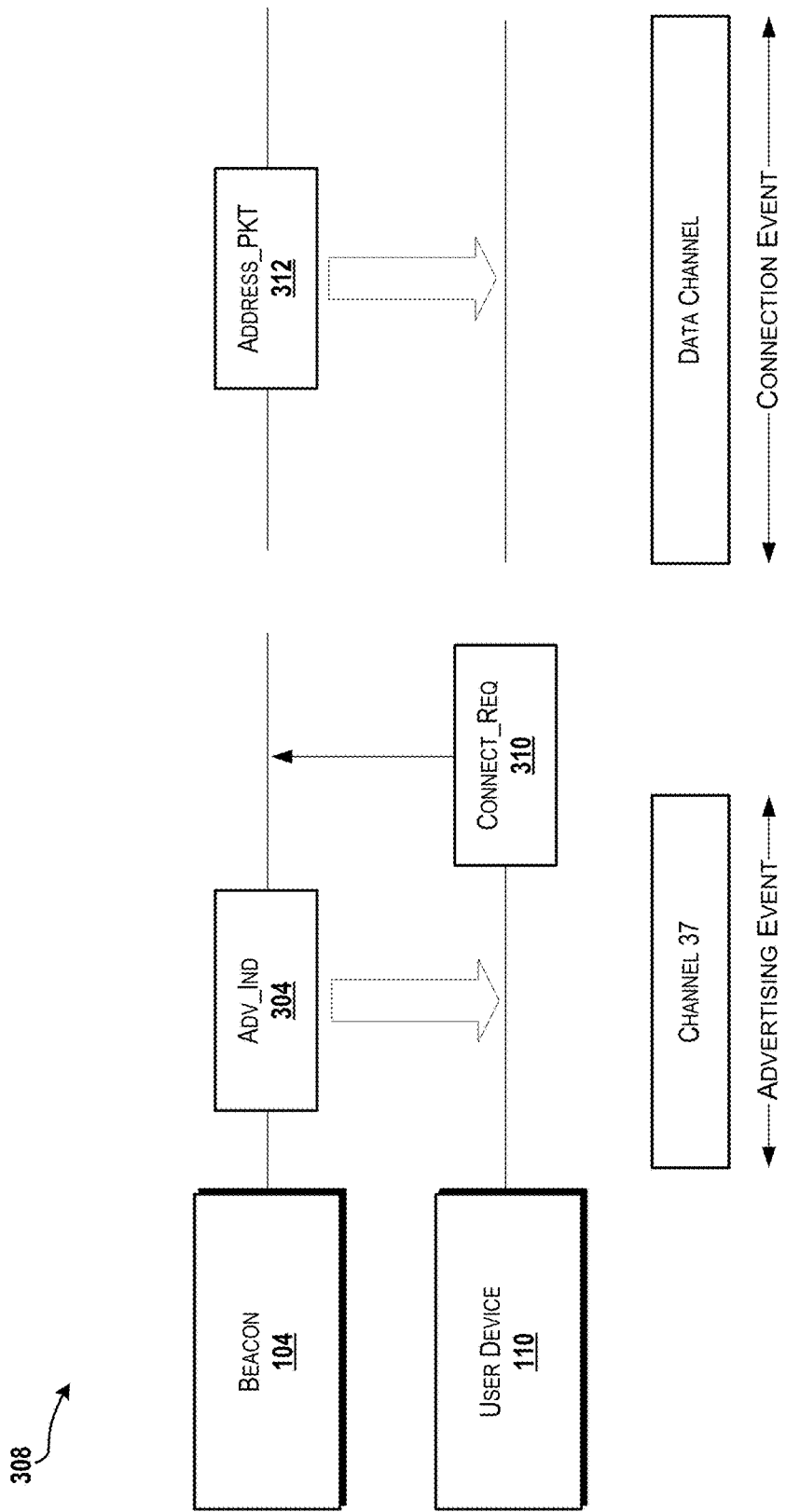

Turning now to FIGS. 3A and 3B, diagrams illustrating aspects of beacon advertisement, beacon discovery and beacon connection will be described, according to illustrative embodiments. Turning first to FIG. 3A, an advertisement diagram 300 will be described. The advertisement diagram 300 includes a beacon 104 of the plurality of beacons 104A-104H and the user device 110. The beacon 104 is operating in an advertising state in which the beacon 104 advertises its presence periodically so that compatible devices, such as the user device 110, can detect the beacon 104 during a scanning state.

In the illustrated example, the beacon 104 generates multiple data units with different protocol data unit ("PDU") types during an advertising state. In particular, the beacon 104 generates ADV_IND data units 304 in accordance with the BLE specification. The ADV_IND data units 304 are used by the beacon 104 to advertise its presence to compatible devices. The user device 110 can detect the ADV_IND data units 304 and, in response, generate a SCAN_REQ data unit 306 to request more information from the beacon 104.

Turning now to FIG. 3B, a discovery and connection diagram 308 will be described. The discovery and connection diagram 308 includes the beacon 104 and the user device 110. The user device 110 generates a CONNECT_REQ data unit 310 to request establishment of a connection to the beacon 104. Once the connection is established, the beacon 104 sends an address packet (ADDRESS_PKT) 312 to the user device 110. The address packet 312 can include the unique address 202 of the beacon 104. The application 128 (shown in FIG. 1) executing on the user device 110 uses the unique address 202 included in the address packet 312 to query the environment database 120 for beacon coordinate data associated with the beacon 104. The application 128 can then cause the user device 110 to measure the received signal strength from the beacon 104 and can calculate the relative distance of the user device 110 from the beacon 104. The application 128 can repeat these operations for each of the plurality of beacons 104A-104H detected within the indoor environment 102 and use the results to estimate the location of the user device 110 within the indoor environment 102, as will be described in greater detail below.

Figure 4:
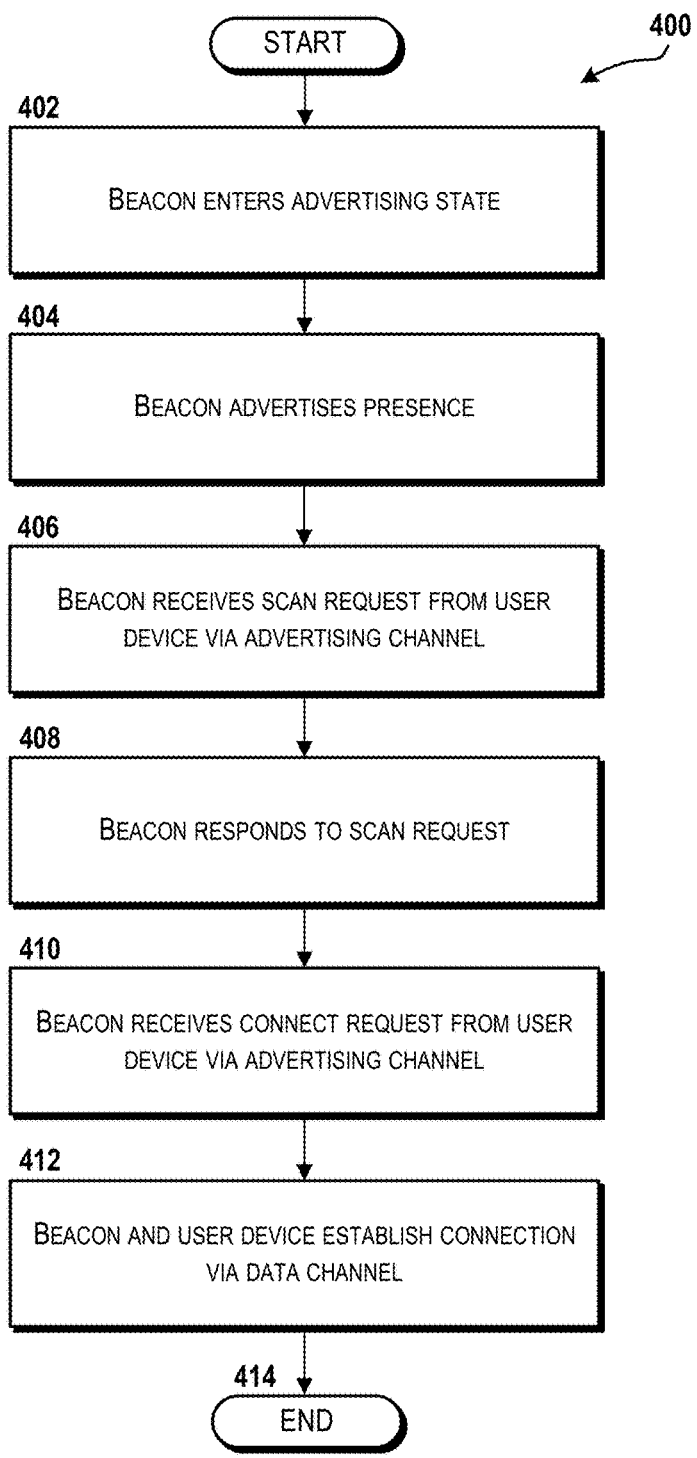
FIG. 4 is a flow diagram illustrating aspects of methods for beacon advertisement, beacon discovery and beacon connection, according to illustrative embodiments.

Turning now to FIG. 4, a method 400 for beacon advertisement, discovery and connection will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example, the beacon 104 (e.g., a microcontroller), the user device 110, the environment analytics system 118, and/or one or more of the other systems 122 to perform one or more operations and/or causing the processor to direct other components of the computing system or device to perform one or more of the operations.

For purposes of illustrating and describing the concepts of the present disclosure, the methods disclosed herein are described as being performed by the beacon 104, the user device 110, the environment analytics system 118, and/or one or more of the other systems 122 alone or in combination via execution of one or more software modules such as, for example, the application 128, the analytics application 130, the software of the other systems 122, and/or the software/firmware component(s) 208. It should be understood that additional and/or alternative devices and/or network nodes can provide the functionality described herein via execution of one or more modules, applications, and/or other software including, but not limited to, the application 128, the analytics application 130, the software of the other systems 122, and/or the software/firmware component(s) 208. Thus, the illustrated embodiments are illustrative, and should not be viewed as being limiting in any way.

The method 400 will be described as being performed by the beacon 200 as an illustrative embodiment of operations that can be performed by each of the plurality of beacons 104A-104H. In some embodiments, multiple beacons perform simultaneously the operations of the method 400. For ease of explanation, however, the method 400 will be described from the perspective of a single beacon.

The method 400 begins at operation 402, where the beacon 200 enters an advertising state during which the beacon 200 can advertise its presence for detection by any compatible devices within range of the beacon 200 (approximately 160 feet for embodiments in which the beacon 200 utilizes BLE). From operation 402, the method 400 proceeds to operation 404, where the beacon 200 advertises its presence, for example, using the ADV_IND data unit 304 (shown in FIGS. 3A and 3B). The beacon 200 can send an ADV_IND data unit 304 every X milliseconds in accordance with a predefined advertisement schedule.

From operation 404, the method 400 proceeds to operation 406, where the beacon 200 receives a scan request, such as the SCAN_REQ data unit 306 (shown in FIG. 3A), from the user device 110. The scan request can include a request for more information about the beacon 200.

From operation 406, the method 400 proceeds to operation 408, where the beacon 200 responds to the scan request with a scan response, such as the SCAN_RSP data unit 302 (shown in FIG. 3A). The scan response can provide additional information about the beacon 200 that may vary according to implementation details. The user device 110 can utilize the additional information contained within the scan response to determine whether or not the user device 110 should attempt connection with the beacon 200. The user device 110 may not want to connect to certain beacons, such as, for example, beacons that belong to a neighboring indoor environment, another user device that is functioning as a beacon, or other reasons.

From operation 408, the method 400 proceeds to operation 410, where the beacon 200 receives a connect request, such as the CONNECT_REQ 310 (shown in FIG. 3B), from the user device 110. From operation 410, the method 400 proceeds to operation 412, where the beacon 200 and the user device 110 establish a connection via a data channel over which the beacon 200 can send information, such as the unique address 202 of the beacon 200, to the user device 110.

From operation 412, the method 400 proceeds to operation 414. The method 400 ends at operation 414.

Figure 5:
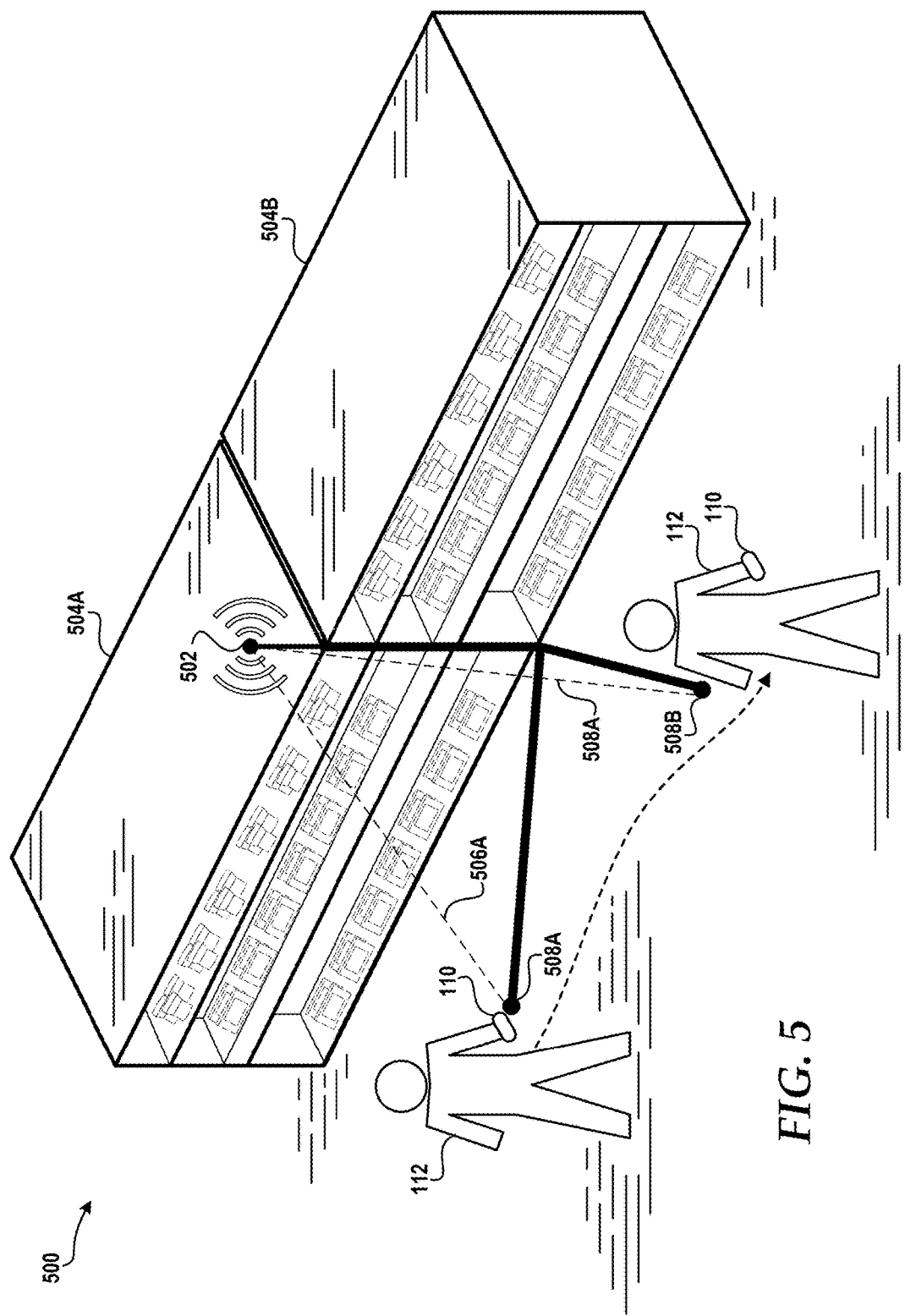
FIG. 5 is a block diagram illustrating aspects of a signal strength measurement and distance calibration within the indoor environment, according to an illustrative embodiment.

Turning now to FIG. 5, a diagram illustrating aspects of a signal strength measurement and distance calibration within the indoor environment 102 will be described, according to an illustrative embodiment. The diagram shown in FIG. 5 will be described with further reference to FIG. 1.

The diagram includes a portion 500 of the indoor environment 102 that includes a calibration beacon 502 that is positioned between shelving units 504A-504B. The calibration beacon 502 can be configured as or similar to the beacon 200 described above with reference to FIG. 2. The calibration beacon 502 is utilized to obtain calibration data for different user devices. Different user devices may have different hardware, power, software, and/or firmware components that affect in one or more ways communications with the beacons 104 deployed within the indoor environment 102. As such, a calibration method can be utilized by a device, such as the user device 110, to measure the signal strength of a signal received from the calibration beacon 502 and to measure and record the distance to the calibration beacon 502 for the corresponding signal strength value.

In some embodiments, the received signal strength is obtained from the operating system of the device as the received signal strength indicator ("RSSI") associated with the communications component associated with the technology (e.g., BLE) used to communicate with the calibration beacon 502. By way of example, the following code sample provides details regarding how a device application that is programmed to perform operations of a calibration method may obtain RSSI values from IOS, available from APPLE INC.:

```
(void)centralManager:(CBCentralManager*)central
didDiscoverPeripheral:(CBPeripheral*)peripheral
advertisementData:(NSDictionary*)
advertisementData RSSI:(NSNumber *)RSSI
```

In the illustrated example, the calibration beacon 502 advertises its presence, such as described above with reference to FIGS. 3A and 4. The user device 110, operating as a calibration device for this example, can receive a first signal 506A from the calibration beacon 502 at a first location 508A and can receive a second signal 506B from the calibration beacon 502 at a second location 508B. The first signal 506A can have a first signal strength value, for example, represented as RSSI(1); and the second signal 506B can have a second signal strength value, for example, represented as RSSI(2). The user device 110 can measure the RSSI(1) to calculate a first distance, and then the distance from the user device 110 to the calibration beacon 502 can be measured manually, for example, represented as D(1), from the first location 508A to the calibration beacon 502. The user device 110 can then measure the RSSI(2), and then the second distance from the user to the beacon measured manually, for example, represented as D(2), from the second location 508B to the calibration beacon 502. The distance values, D(1) and D(2), can be associated with the RSSI values, RSSI(1) and RSSI(2), respectively, and the specifications of both the calibration beacon 502 and the user device 110. The process can be repeated for each beacon and device pair at several points to obtain adequate number of RSSI and distance pairs in order to calculate device locations properly. This information, collectively referred to herein as "calibration data," can be sent by the user device 110 to the environment analytics system 118 for storage in the environment database 120 as part of the beacon data 140.

It is contemplated that before, during or after implementation of beacons within an environment, a calibration method such as described above and as further described below with reference to FIG. 6 can be performed for different user device and beacon combinations. In some embodiments, user devices may be leveraged to perform the calibration method prior to deployment of one or more beacons within an environment, as part of an initial setup process (e.g., when a user first uses the application 128 within the indoor environment 102), from time to time on an opt-in basis, or otherwise to ensure the beacon calibration data 144 stored within the environment database 120 includes calibration data for the latest user devices available.

Figure 6:
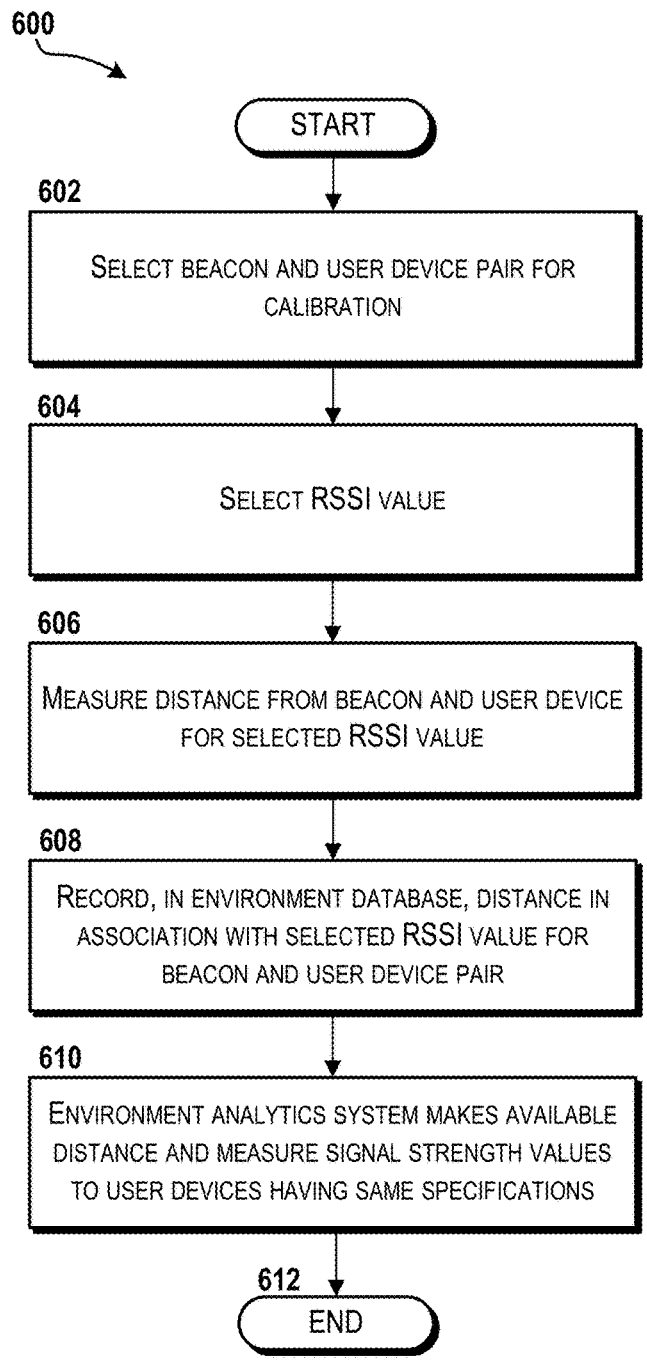
FIG. 6 is a flow diagram illustrating aspects of a method for determining calibration data for a beacon and user device pair, according to an illustrative embodiment.

Turning now to FIG. 6, aspects of a calibration method 600 for determining calibration data for a beacon and user device pair will be described in detail, according to an illustrative embodiment.

The method 600 begins at operation 602, where a beacon and user device pair are selected for calibration. From operation 602, the method 600 proceeds to operation 604, where an RSSI value is selected. From operation 604, the method 600 proceeds to operation 606, where the distance from the selected beacon and user device is measured for the selected RSSI value. From operation 606, the method 600 proceeds to operation 608, where the distance measured at operation 606 is recorded, in the environment database 120 in association with the selected RSSI for the selected beacon and user device pair.

From operation 608, the method 600 proceeds to operation 610, where the environment analytics system 118 makes available the measure distance value, the RSSI value, the unique address of the selected beacon, and the device specifications to the application 128 of the user device 110 and other similar application of other user devices for use in location determinations as will be described in greater detail below.

From operation 610, the method 600 proceeds to operation 612. The method 600 ends at operation 612. The method 600 can be repeated for each beacon/user device pair that are to be used in a deployment within the indoor environment 102. After deployment, a similar method may be used to re-calibrate previously calibrated beacon/user device pairs and/or add calibration data for new beacon/user device pairs.

Figure 7A:
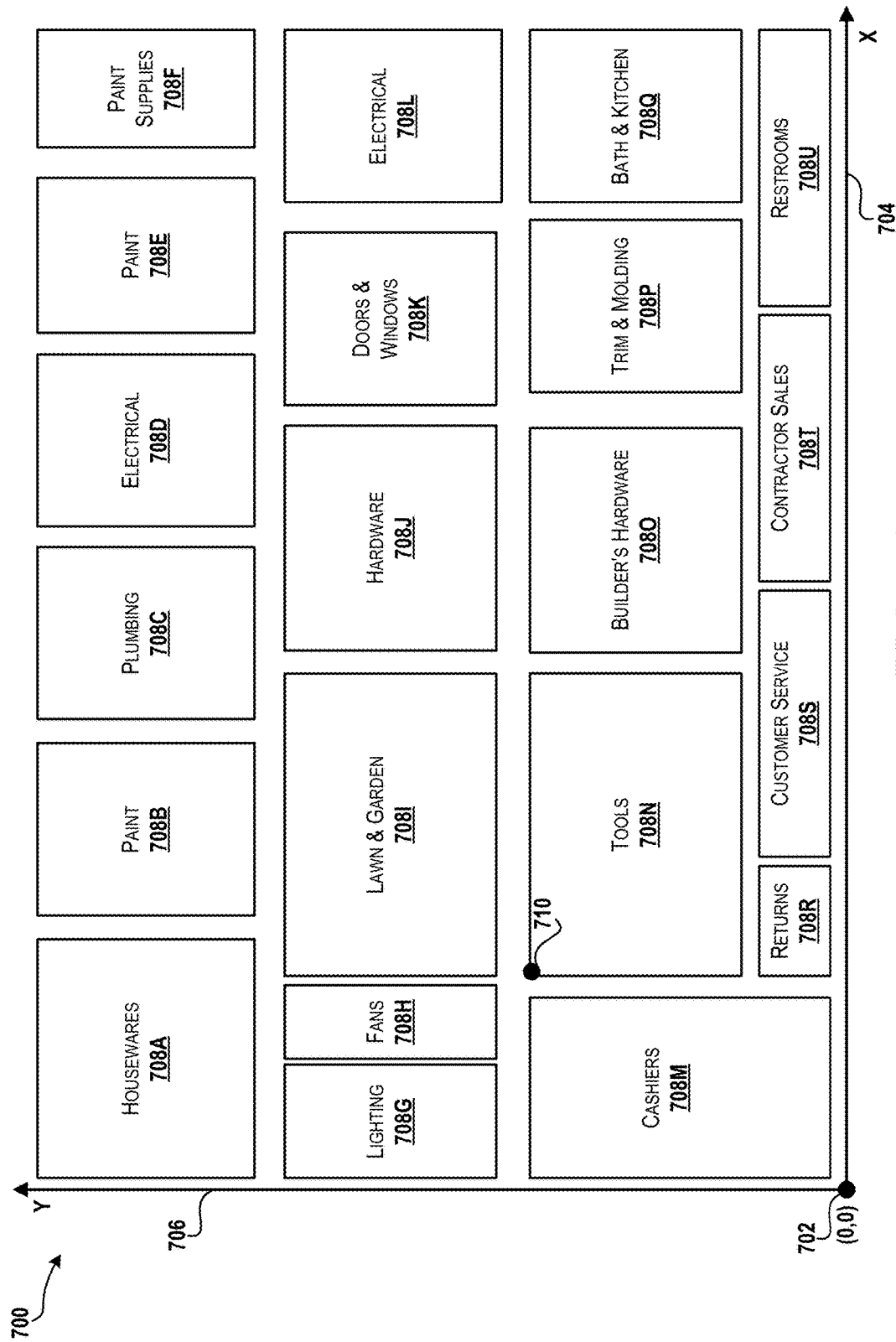
FIGS. 7A-7B are example store layouts on a two-dimensional coordinate system, according to an illustrative embodiment.
Figure 7B:
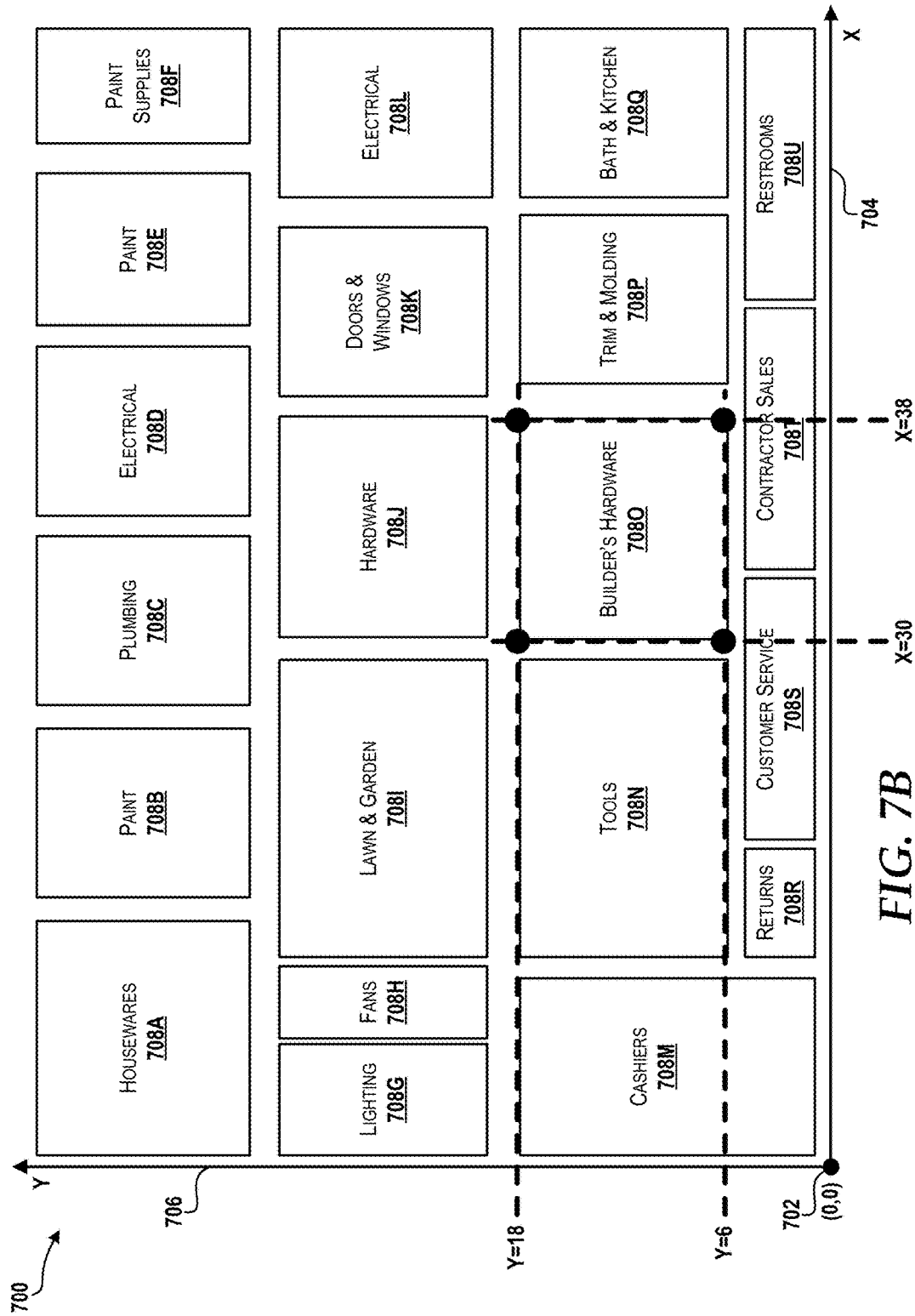

Turning now to FIGS. 7A and 7B, an example store layout 700 on a two-dimensional coordinate system will be described, according to an illustrative embodiment. Turning first to FIG. 7A, the coordinate system includes an absolute reference point 702. The absolute reference point 702 can be located anywhere within the store layout 700, but for convenience and ease of description, the absolute reference point 702 is shown in the lower-hand corner of the store layout 700 and represents the southwest corner of an example store. An X-axis 704 extends horizontally from the absolute reference point 702 and represents the west-to-east direction. A Y-axis 706 extends vertically from the absolute reference point 702 and represents the south-to-north direction. It should be understood, however, that the actual alignment of south-to-north and/or east-to-west directions is not required because the coordinate system is based upon relative positions with respect to the absolute reference point 702.

The store layout 700 includes a plurality of sections 708A-708U. The coordinates that define each of the plurality of sections 708A-708U can be determined as a relative distance from absolute reference point 702. For example, a point 710 represents the location of the upper left-hand corner of a tools section 708N of the store layout 700. In this manner, each of the plurality of sections 708A-708U can be defined using one or more coordinate pairs in reference to the absolute reference point 702.

Turning now to FIG. 7B, the store layout 700 is shown with coordinate pairs for each corner of a builder's hardware section 708O of the store layout 700. In particular, the upper left-hand corner of the builder's hardware section 708O is assigned the coordinate pair (30, 18), the upper right-hand corner of the builder's hardware section 708O is assigned the coordinate pair (38, 18), the lower left-hand corner of the builder's hardware section 708O is assigned the coordinate pair (30, 6), and the lower right-hand of the builder's hardware section 708O is assigned coordinate pair (38, 6). The combination of the aforementioned coordinate pair defines the four corners of the rectangular-shaped builder's hardware section 708O. Coordinate pairs that define each of the plurality of sections 708A-708U can be defined in accordance with the method described below with reference to FIG. 8.

Figure 8:
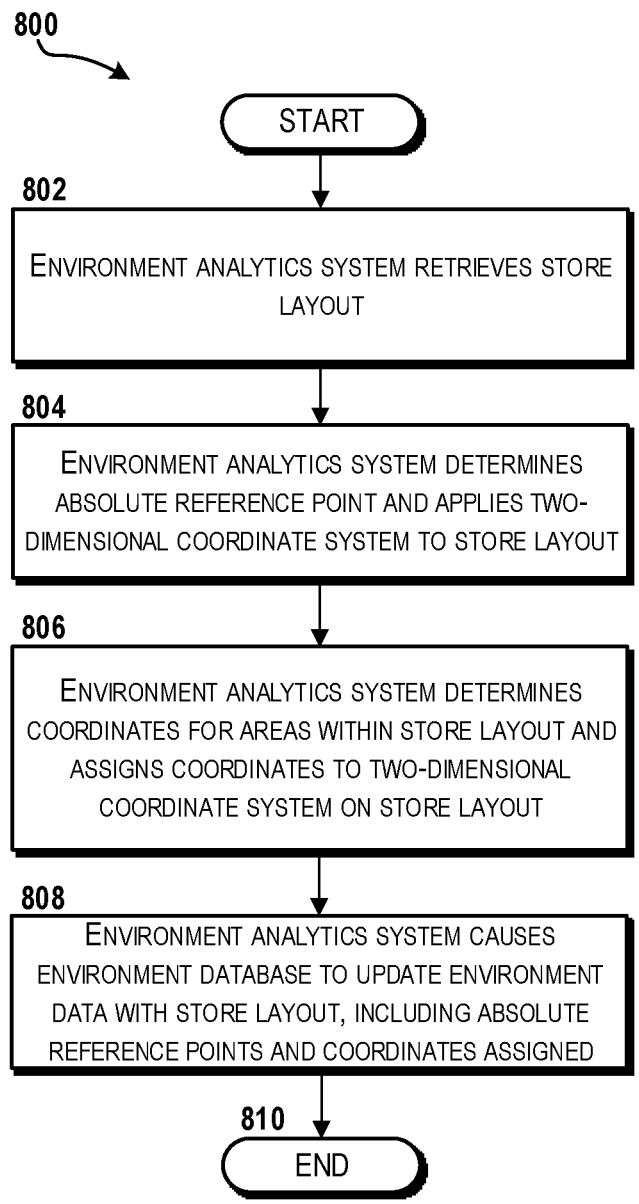
FIG. 8 is a flow diagram illustrating aspects of a method for determining reference points for an indoor environment, according to an illustrative embodiment.

Turning now to FIG. 8, a method 800 for determining reference points for an environment will be described, according to an illustrative embodiment. The method 800 will be described with further reference to FIGS. 1, 7A and 7B and, more particularly, the environment for which reference points are determined in the method 800 is the indoor environment 102 introduced in FIG. 1 with the example store layout 700 introduced in FIG. 7A. It should be understood, however, that the method 800 is applicable to any environment having any layout and therefore the examples illustrated and described herein should not be construed as being limiting in any way. Moreover, the method 800 is described as being performed by the environment analytics system 118 via execution of one or more software applications. It should be understood, however, that other computing systems and/or devices may perform the method 800 or a similar method to determine the reference points for a given environment layout. In other implementations, some or all of the operations of the method 800 are performed responsive to inputs received from one or more users.

The method 800 begins and proceeds to operation 802, where the environment analytics system 118 retrieves the store layout 700 for the indoor environment 102 from the environment database 120. From operation 802, the method 800 proceeds to operation 804, where the environment analytics system 118 determines an absolute reference point, such as the absolute reference point 702 in FIGS. 7A and 7B, for the store layout 700. Also at operation 804, the environment analytics system 118 applies a two-dimensional coordinate system to the store layout 700.

In some embodiments, the environment analytics system 118 selects an absolute reference point. The environment analytics system 118 may select an absolute reference point based upon user input. The environment analytics system 118 may execute the analytics application 130 to select a pre-programmed location (such as the southwest corner in FIGS. 7A and 7B) within a given layout as an absolute reference point. The environment analytics system 118 may execute the analytics application 130 to analyze the store layout 700 and to determine an absolute reference point based upon an algorithm that may or may not consider previous determinations of absolute reference points in determining an absolute reference point for the store layout 700. In some other embodiments, the absolute reference point and coordinate system is pre-assigned to the layout and, as such, the operation 804 may be skipped.

From operation 804, the method 800 proceeds to operation 806, where the environment analytics system 118 determines coordinates for one or more areas, such as the plurality of sections 708A-708U shown in FIGS. 7A and 7B, within the store layout 700 and assigns coordinates to the two-dimensional coordinate system on the layout. From operation 806, the method 800 proceeds to operation 808, where the environment analytics system 118 updates the environment data 132 stored in the environment database 120 with the store layout 700, including the absolute reference point and the assigned coordinates for one or more areas of the store layout 700.

From operation 808, the method 800 proceeds to operation 810. The method 800 ends at operation 810.

Turning now to FIG. 9, a coordinate assignment table 900 illustrating coordinate assignments for various areas within indoor environments will be described, according to an illustrative embodiment. The coordinate assignment table 900 can be generated, at least in part, using the method 800 described above. The coordinate assignment table 900 is illustrated for a single store, such as the indoor environment with the store layout 700 shown in FIGS. 7A and 7B, but alternatively may be used for multiple stores such as stores belonging to a franchise or other business chain. The coordinate assignment table 900 can be stored in the environment database 120 as part of the environment data 132 and can be updated from time-to-time to accommodate for changes to the store layout 700. For example, a new promotion may temporarily change the size or arrangement of one or more sections of the store layout 700.

The illustrated coordinate assignment table 900 includes a store number column 902, a section description column 904, an $X_1$ coordinate column, an $X_2$ coordinate column 906, a $Y_1$ coordinate column, and a $Y_2$ coordinate column. It is contemplated that a different number of coordinate columns may be provided in the coordinate assignment table 900.

The store number column 902 identifies a store number associated with the particular store to which the values of the other columns belong. In the illustrated example, the store number is the same for each row, but some implementations may include different store numbers to identify different stores within a franchise or other business chain. Store names or other descriptions may be used as an alternative to or in addition to the store number in the store number column 902 or in another column (not shown).

The section column 904 identifies the section or other area defined by coordinate pairs in columns 906-912. The $X_1$ coordinate column 906 identifies a first X-coordinate (e.g., associated with a first corner) for each section listed in the section column 904. The $X_2$ coordinate column 908 identifies a second X-coordinate (e.g., associated with a second corner) for each section listed in the section column 904. The $Y_1$ coordinate column 910 identifies a first Y-coordinate (e.g., associated with a first corner) for each section listed in the section column 904. The $Y_2$ coordinate column 912 identifies a second Y-coordinate (e.g., associated with a second corner) for each section listed in the section column 904.

Figure 10A:
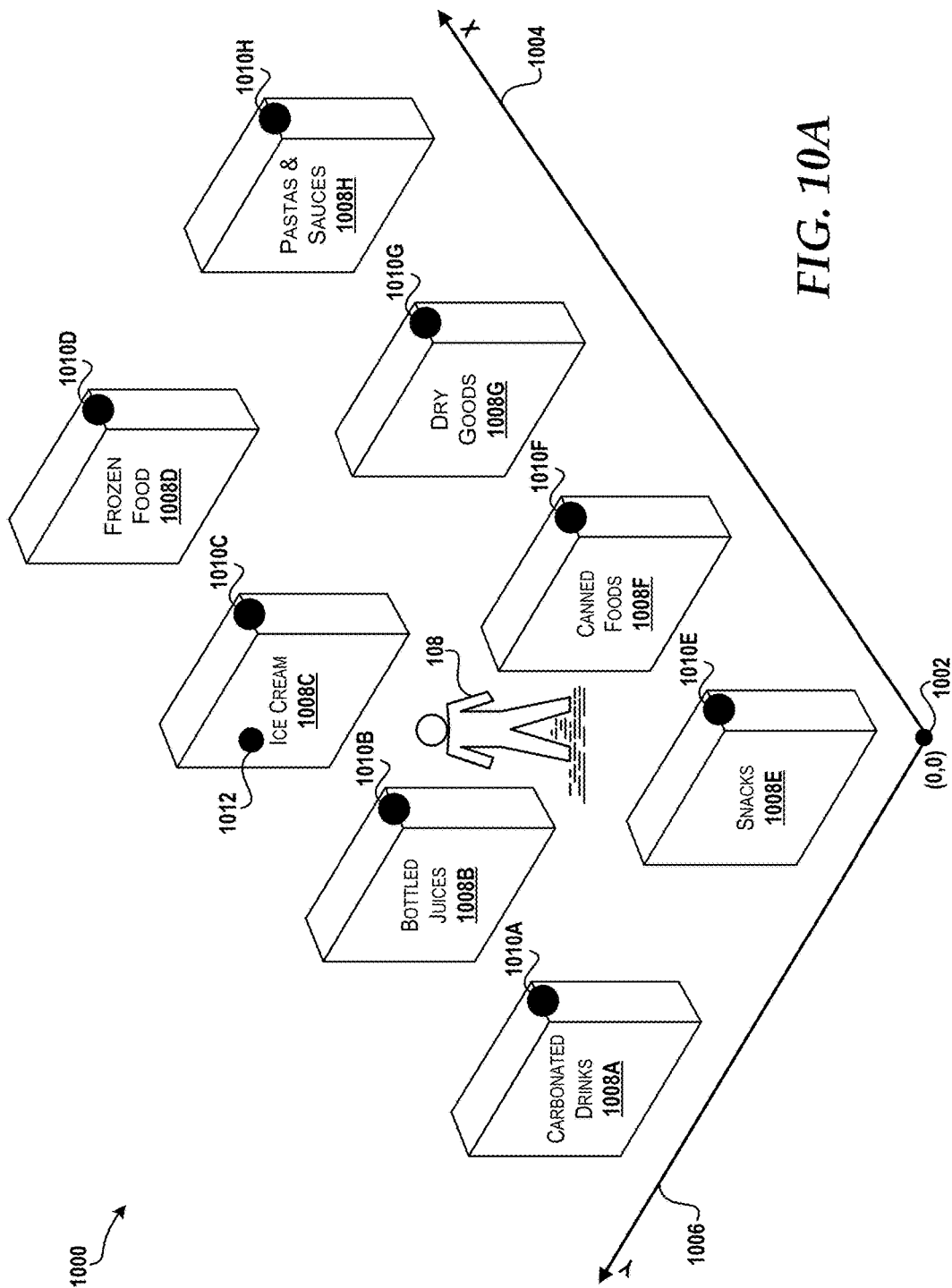
FIGS. 10A-10B are example beacon layouts illustrating beacon placements on a two-dimensional coordinate system, according to an illustrative embodiment.
Figure 10B:
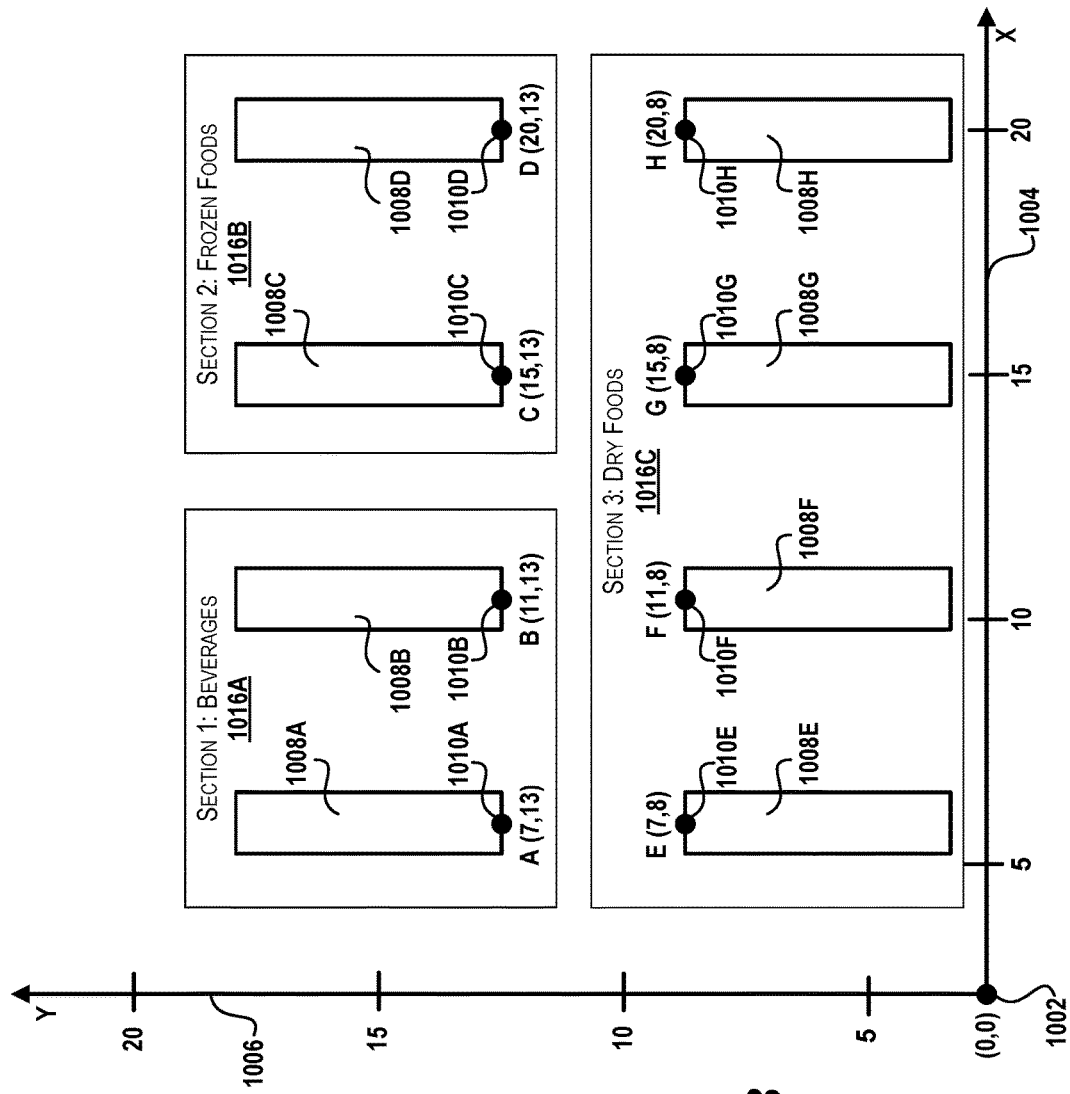

Turning now to FIGS. 10A-10B, an example beacon layout 1000 within the indoor environment 102 will be described, according to an illustrative embodiment. The FIGS. 10A-10B will be described with additional reference to FIG. 1.

Turning first to FIG. 10A, the beacon layout 1000 includes a two-dimensional coordinate system with an absolute reference point 1002. An X-axis 1004 extends from the absolute reference point 1002 in a first direction. A Y-axis 1006 extends from the absolute reference point 1002 in a second direction. The beacon layout 1000 also includes a plurality of shelving units 1008A-1008H associated with a plurality of reference points 1010A-1010H, respectively. Beacons, such as the plurality of beacons 104A-104H, can be positioned, respectively, on, within, beneath, or within a predefined proximity of the plurality of shelving units 1008A-1008H. The location of these beacons is represented by coordinate pairs of the reference points 1010A-1010H, similar to the example illustrated in FIG. 1. In addition, an ice cream shelving unit 1008C includes a promotional reference point 1012 used to indicate the coordinate for a promotional ice cream product stored on the ice cream shelving unit.

Turning now to FIG. 10B, the plurality of reference points 1010A-1010H are shown with coordinate pair values for the associated beacons. The plurality of shelving units 1008A-1008G also are divided into sections 1016A-1016C representative of different product categories. The coordinate pair values, unique address, beacon type, and section can be stored in a beacon data table 1100, which will now be described.

Turning now to FIG. 11, the beacon data table 1100 will be described, according to an illustrative embodiment. The beacon data table 1100 can be stored in the environment database 120 as part of the beacon data 140 and can be updated from time-to-time to accommodate changes. The illustrated beacon data table 1100 includes a unique address column 1102, a beacon type 1104, an X coordinate column 1106, a Y coordinate column 1108, and a section description column 1110.

The unique address column 1102 identifies the unique address for each beacon. The beacon type column 1104 identifies the beacon type for each beacon. The X coordinate column 1106 identifies an X-coordinate for each beacon. The Y coordinate column 1108 identifies a Y-coordinate for each beacon. The section description column 1110 identifies the section in which each beacon is located.

Figure 12:
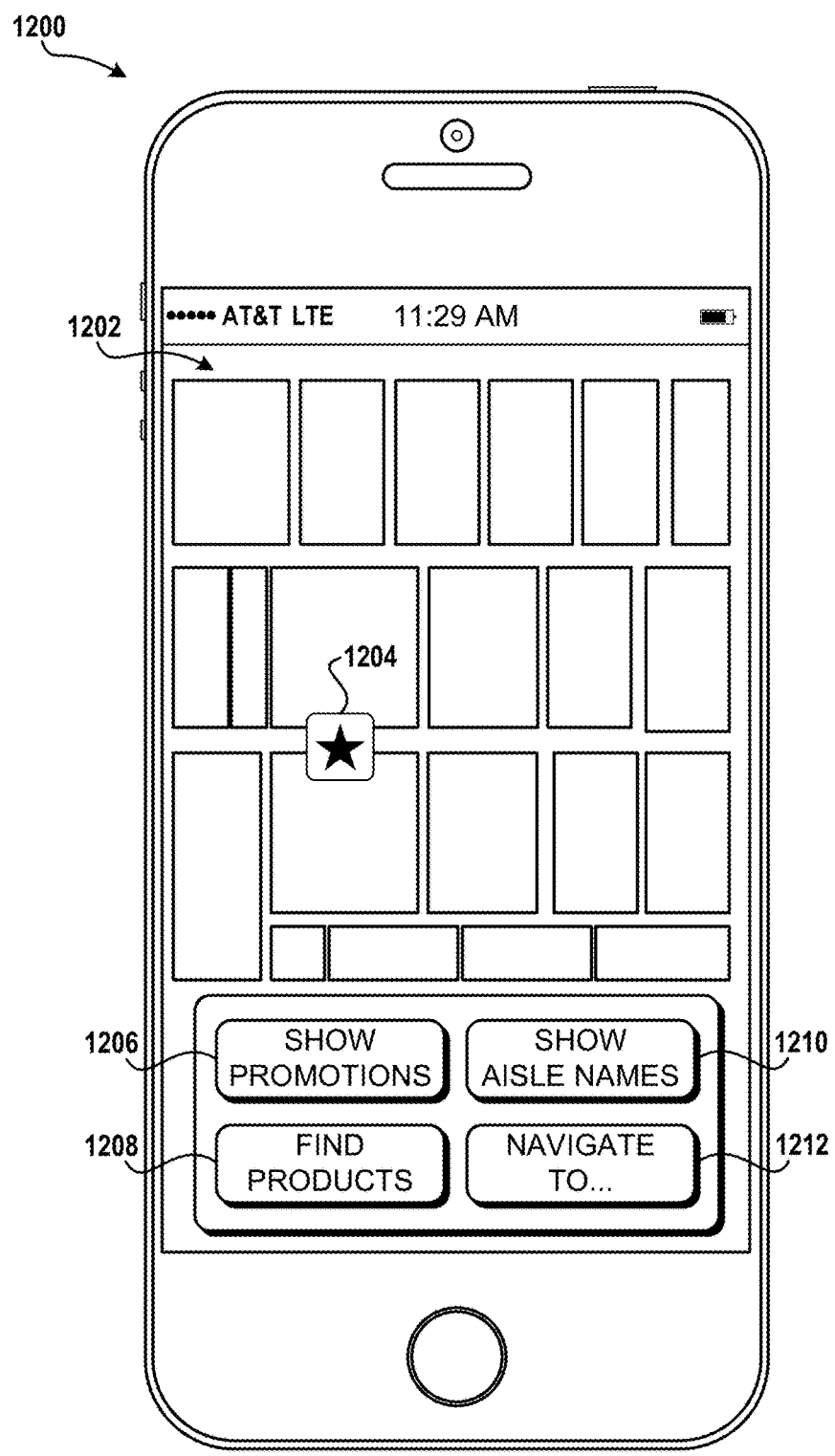
FIG. 12 is a user interface diagram illustrating a user device location within a store layout and available options for user interaction, according to an illustrative embodiment.

Turning now to FIG. 12, a user interface 1200 will be described, according to an illustrative embodiment. The user interface 1200 include a store map 1202 on which a device location 1204 is presented. The device location 1204 indicates the location of the user device 110 so the user 112 knows where on the store map 1202 he or she is located.

The user interface 1200 also includes selectable options. A first option 1206 that, when selected by the user 112, causes the user device 110 to present one or more promotions that are available. A second option 1210, when selected by the user 112, causes the user device 110 to present names of the aisles on the store map 1202. A third option 1208, when selected by the user 112, causes the user device 110 to present a product search interface through which the user 112 can search for specific product types, product names, and enter other search criteria to locate one or more products on the map 1202. A fourth option 1212, when selected by the user 112, causes the user device 1110 to present a navigation interface through which the user 112 can enter a destination (e.g., a particular section of the store) to which he or she wants to navigate.

Figure 13:
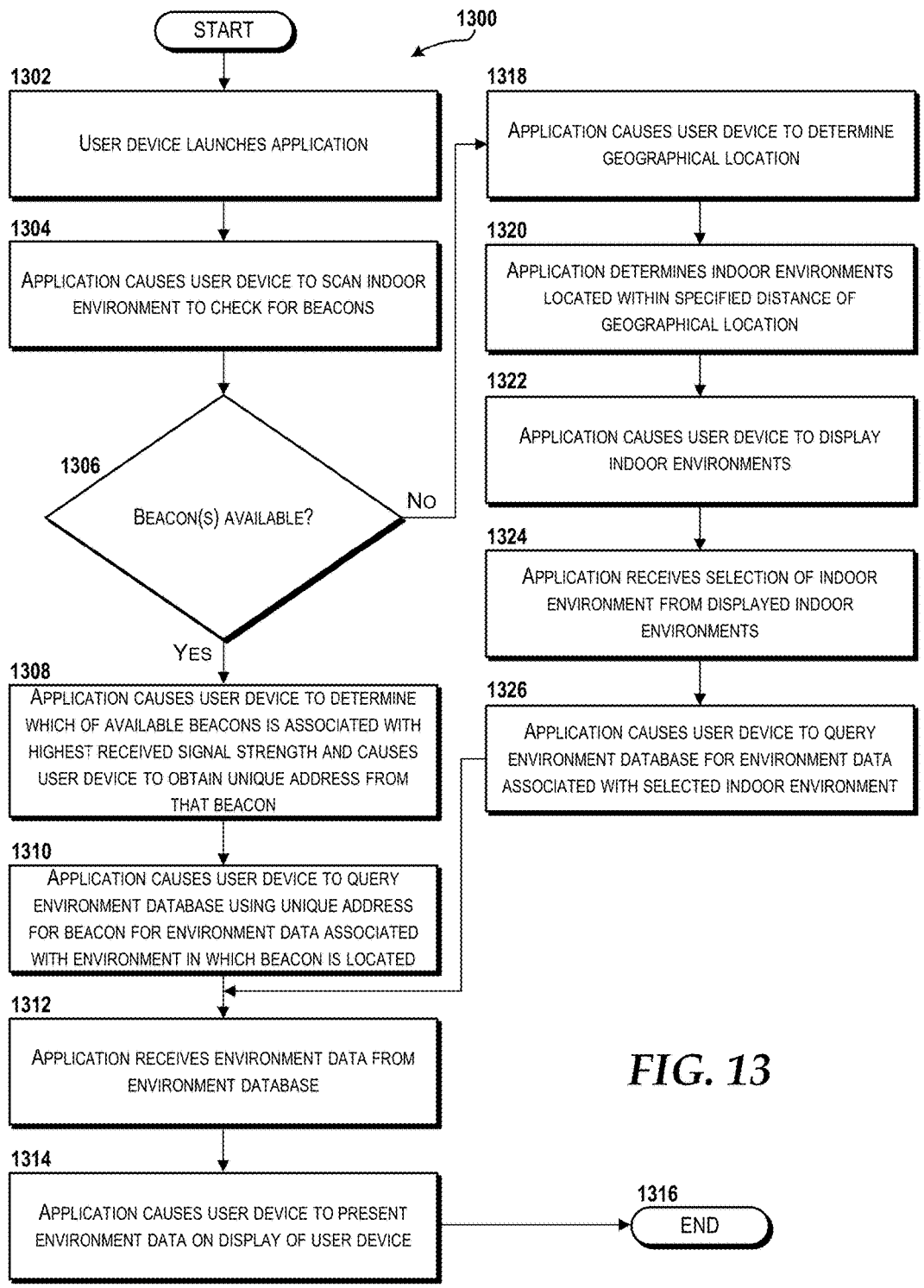
FIG. 13 is a flow diagram illustrating aspects of a method for obtaining indoor environment data for presentation on a display of a user device, according to an illustrative embodiment.

Turning now to FIG. 13, a method 1300 for obtaining indoor environment data for presentation on a display on the user device 110 will be described, according to an illustrative embodiment. The method 1300 begins and proceeds to operation 1302, where the user device 110 launches the application 128. From operation 1302, the method 1300 proceeds to operation 1304, where the application 128 causes the user device 110 to scan the indoor environment 102 to check for available beacons. From operation 1304, the method 1300 proceeds to operation 1306, where the application 128 determines if one or more beacons are available. If one or more beacons are available, the method 1300 proceeds to operation 1308, where the application 128 causes the user device 110 to determine which of the available beacons is associated with the highest received signal strength and causes the user device 110 to obtain the unique address from that beacon.

From operation 1308, the method 1300 proceeds to operation 1310, where the application 128 causes the user device 110 to query the environment database 120 using the unique address obtained at operation 1308 for environment data associated with the indoor environment 102 in which the beacon is located. From operation 1310, the method 1300 proceeds to operation 1312, where the application 128 receives the environment data from the environment database 120. From operation 1312, the method 1300 proceeds to operation 1314, where the application 128 causes the user device 110 to present the environment data on a display of the user device 110.

From operation 1314, the method 1300 proceeds to operation 1316. The method 1300 ends at operation 1316.

If the application 128 determines, at operation 1306, that no beacons are available, the method 1300 proceeds to operation 1318, where the application 128 causes the user device 110 to determine its geographical location using cellular triangulation, WI-FI triangulation, GPS, other location determining techniques, or a combination thereof. From operation 1318, the method 1300 proceeds to operation 1320, where the application 128 determines the indoor environments that are located within a specified distance of the geographical location. From operation 1320, the method 1300 proceeds to operation 1322, where the application 128 causes the user device 110 to display the indoor environments. From operation 1322, the method 1300 proceeds to operation 1324, where the application 128 receives a selection of one of the indoor environments from the displayed indoor environments.

From operation 1324, the method 1300 proceeds to operation 1326, where the application 128 causes the user device 110 to query the environment database 120 for environment data associated with the selected indoor environment. From operation 1326, the method 1300 proceeds to operation 1312, where the application 128 receives the environment data from the environment database 120. From operation 1312, the method 1300 proceeds to operation 1314, where the application 128 causes the user device 110 to present the environment data on a display of the user device 110.

From operation 1314, the method 1300 proceeds to operation 1316. The method 1300 ends at operation 1316.

Figure 14:
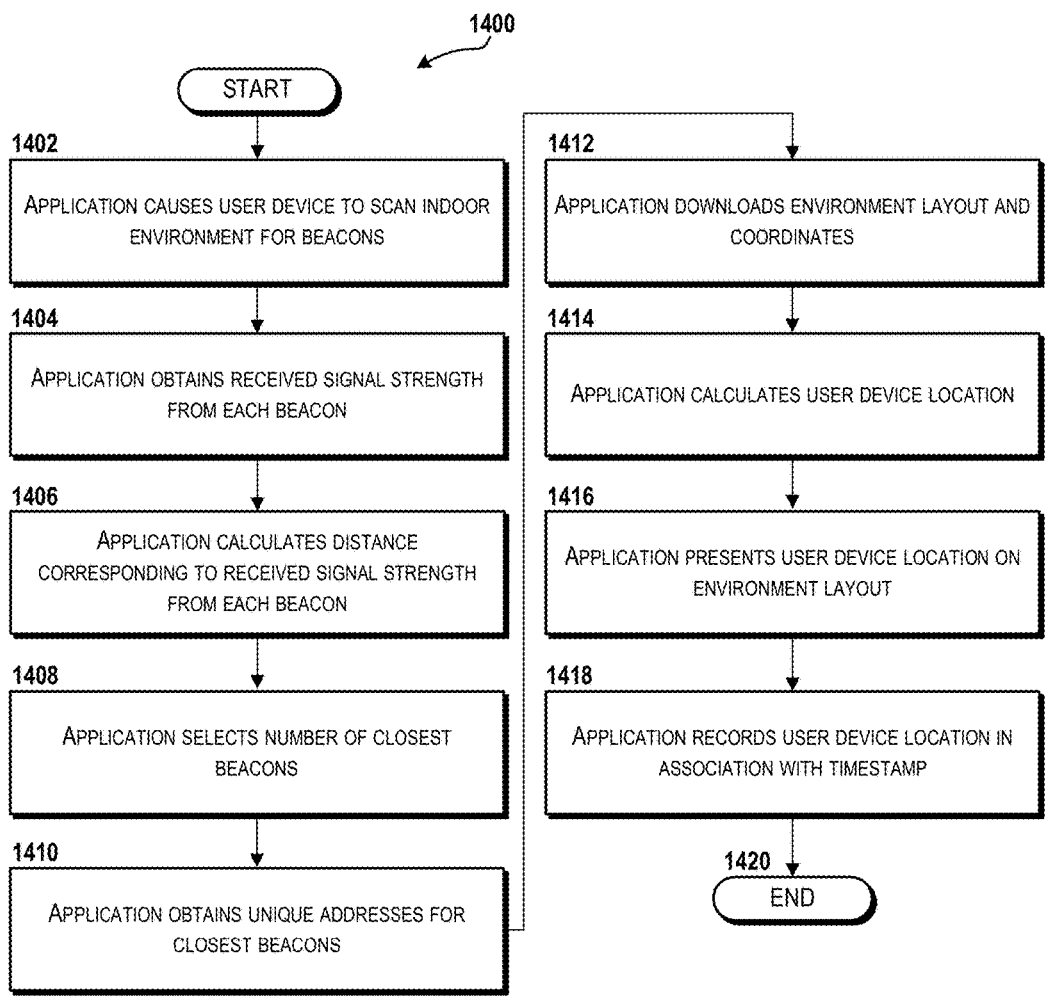
FIG. 14 is a flow diagram illustrating aspects of a method for determining a location of a user device within an indoor environment, according to an illustrative embodiment.

Turning now to FIG. 14, a method 1400 for determining the location of the user device 110 within the indoor environment 102 will be described, according to an illustrative embodiment. The method 1400 begins and proceeds to operation 1402, where the application 128 causes the user device 110 to scan the indoor environment 102 for beacons. From operation 1402, the method 1400 proceeds to operation 1404, where the application 128 obtains the received signal strength from the each available beacon. From operation 1404, the method 1400 proceeds to operation 1406, where the application 128 calculates the distance corresponding to the received signal strength from each beacon using the calibration information (i.e., the distance and signal strength values generated during the method 600). From operation 1406, the method 1400 proceeds to operation 1408, where the application 128 selects a number of closest beacons. In some embodiments, the application 128 is programmed to select at least three of the closest beacons. It should be understood that the application 128 may be programmed to select any number of closest beacons, although resulting distance calculations may be more or less accurate as a result.

From operation 1408, the method 1400 proceeds to operation 1410, where the application 128 obtains the unique address for each of the closest beacons. From operation 1410, the method 1400 proceeds to operation 1412, where the application 128 downloads the environment layout and coordinates associated with the closest beacons. From operation 1412, the operation 1400 proceeds to operation 1414, where the application 128 calculates the location of the user device 110. From operation 1414, the method 1400 proceeds to operation 1416, where the application 128 presents the location of the user device 110 on the environment layout. From operation 1416, the method 1400 proceeds to operation 1418, where the application 128 causes the user device 110 to record the location of the user device 110 in association with the timestamp.

From operation 1418, the method 1400 proceeds to operation 1420. The method 1400 ends at operation 1420.

In some embodiments, output of a gyroscope, accelerometer and/or other sensor(s) of the user device 110 can be used by the application 128 to continuously monitor whether the user device 110 has moved a distance that at least meets a predefined movement threshold. If so, the application 128 can recalculate the location of the user device 110 in accordance with the operations described above.

Figure 15:
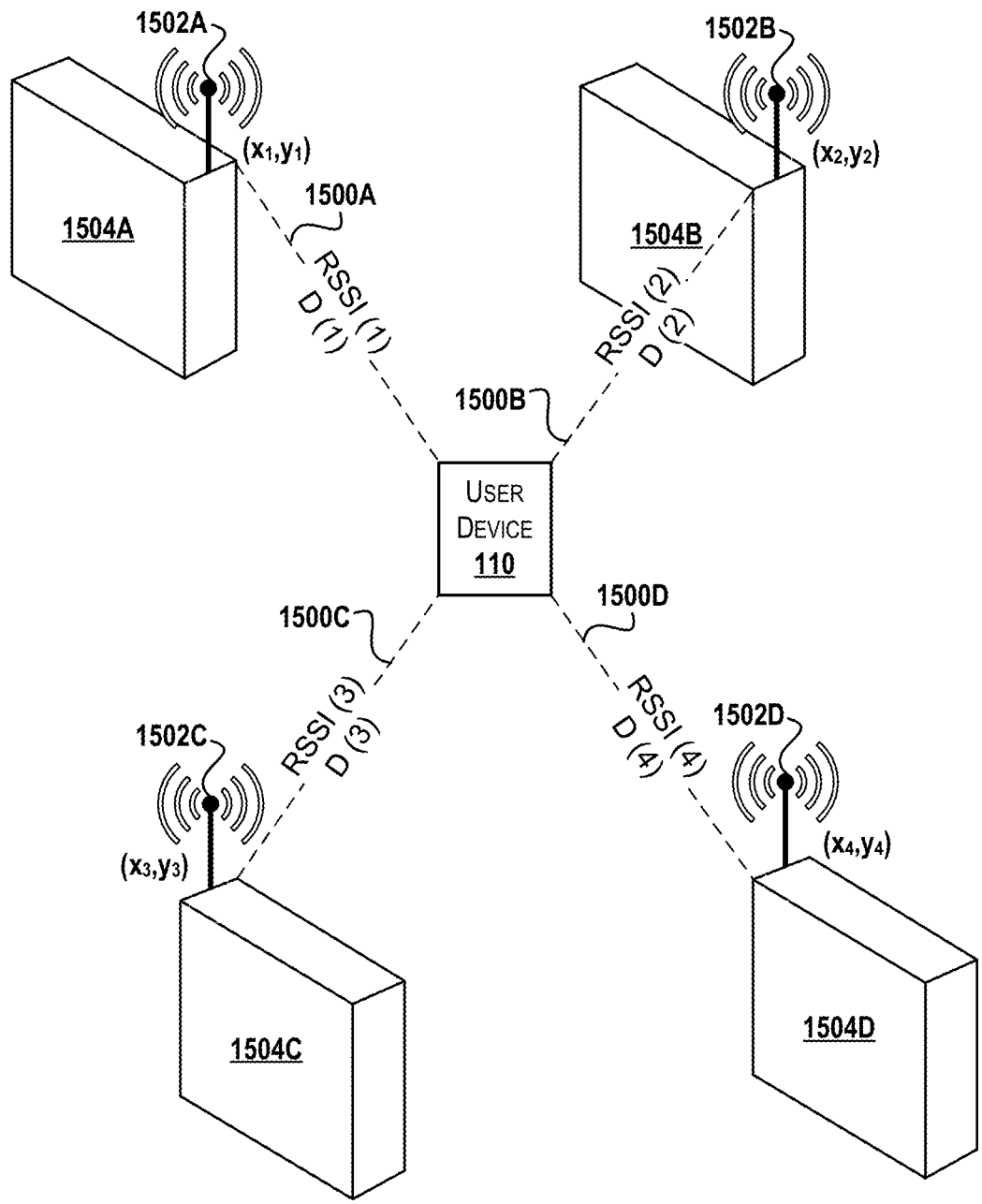
FIG. 15 is a block diagram illustrating a user device receiving signals from a plurality of beacons within an indoor environment, according to an illustrative embodiment.

Turning now to FIG. 15, a block diagram illustrating the user device 110 receiving signals 1500A-1500D from beacons 1502A-1502D associated with shelving units 1504A-1504D, respectively, will be used as further reference for FIGS. 16-18 described below.

Figure 16:
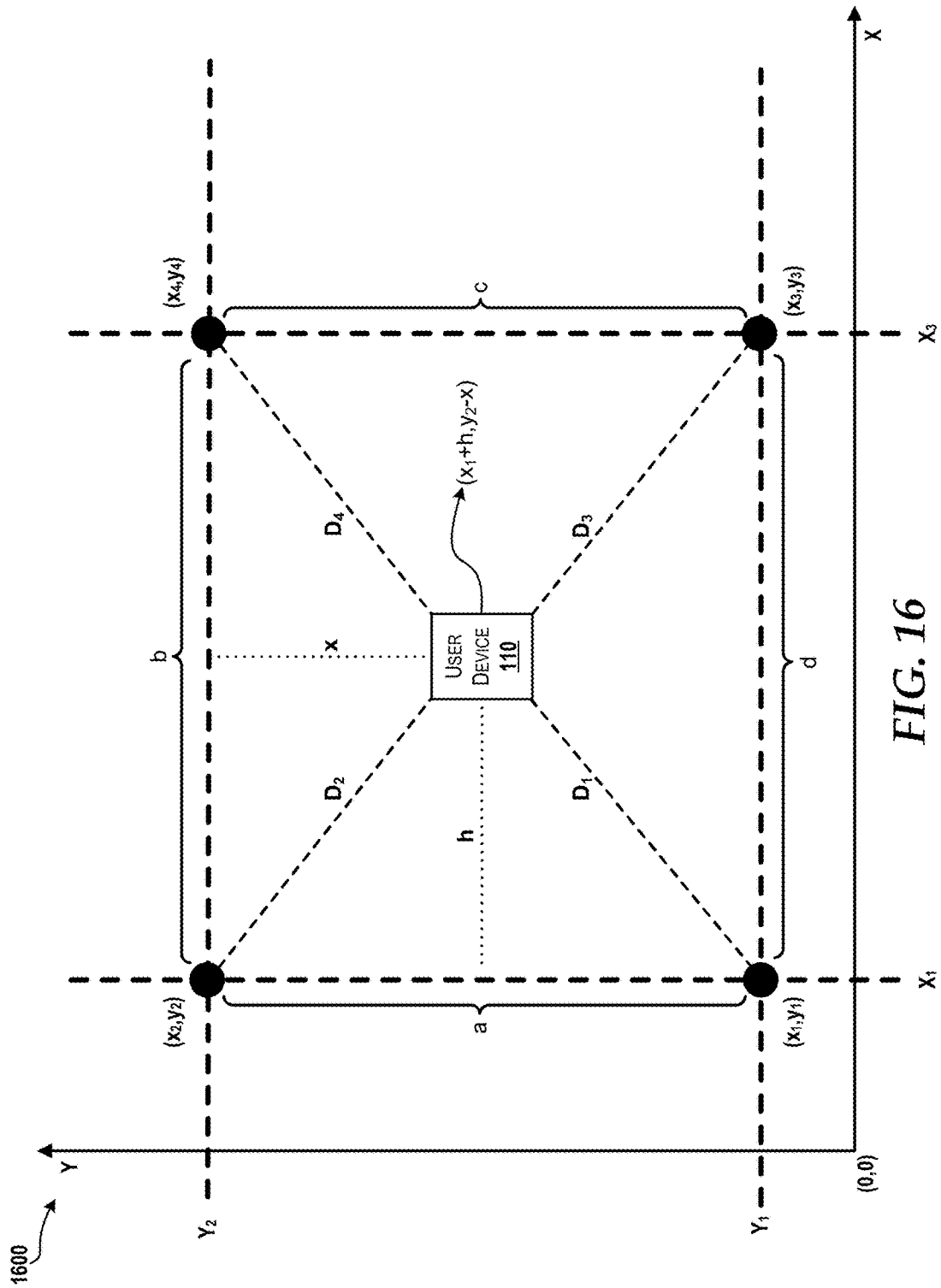
FIG. 16 is a graph illustrating a user device receiving signals from a plurality of beacons within an indoor environment for use in calculating coordinates of the user device, according to an illustrative embodiment.

Turning now to FIG. 16, a graph 1600 illustrating the user device 110 receiving the signals 1500A-1500D from the beacons 1502A-1502D for use in calculating coordinates of the user device 110 will be described, according to an illustrative embodiment. The coordinate pairs $(x_1, y_1)$, $(x_2, y_2)$, $(x_3, y_3)$, and $(x_4, y_4)$ are known (i.e., these coordinate pairs are predefined and recorded beacon coordinates stored in the environment database 120). D1, D2, D3, and D4 are the distances from the beacon coordinate pairs. These distances are calculated from the measured RSSI as explained above.

The graph 1600 shows the coordinate pair for the location of the user device 110 as $(x_1+h, Y_2-x)$. The below calculation explains how h and x can be calculated, using the known parameters. If a to b to c to d forms a rectangle as illustrated, then $a=c=y_2-y_1$; $b=d=x_3-x_1$; $x^2+h^2=(D_2)^2$ (Equation I); $h^2+(a-x)^2=(D_1)^2$ (Equation II); $\cos(C)=(a-x)/D_1$; or $a-x=D_1 \cos(C)$. Thus, $x=a-D_1 \cos(C)$ (Equation III). Expanding Equation II yields $h^2 \ a^2-2ax+x^2=(D_1)^2$. Using Equation I, $x^2+h^2$ can be replaced by $D_2^2$, then using the Equation III, x can be replaced by $a-D_1 \cos(C)$. The resulting equation can then be simplified, yielding $(D_2)^2=a^2+(D_1)^2-2 \ D_2 \ D_1 \cos(C)$, where a, $D_1$, and $D_2$ are all known. Cos (C) can be calculated as $\cos(C)=[(a^2+(D_1)^2-(D_2)^2/(2 \ D_2 \ D_1)]$. If Cos (C) is known, then x can be calculated using Equation III and h can be calculated using Equation II. Thus, the coordinates of the user device 110 can be calculated as $(x_1+h, Y_2-x)$, as all the parameters are known.

Figure 17:
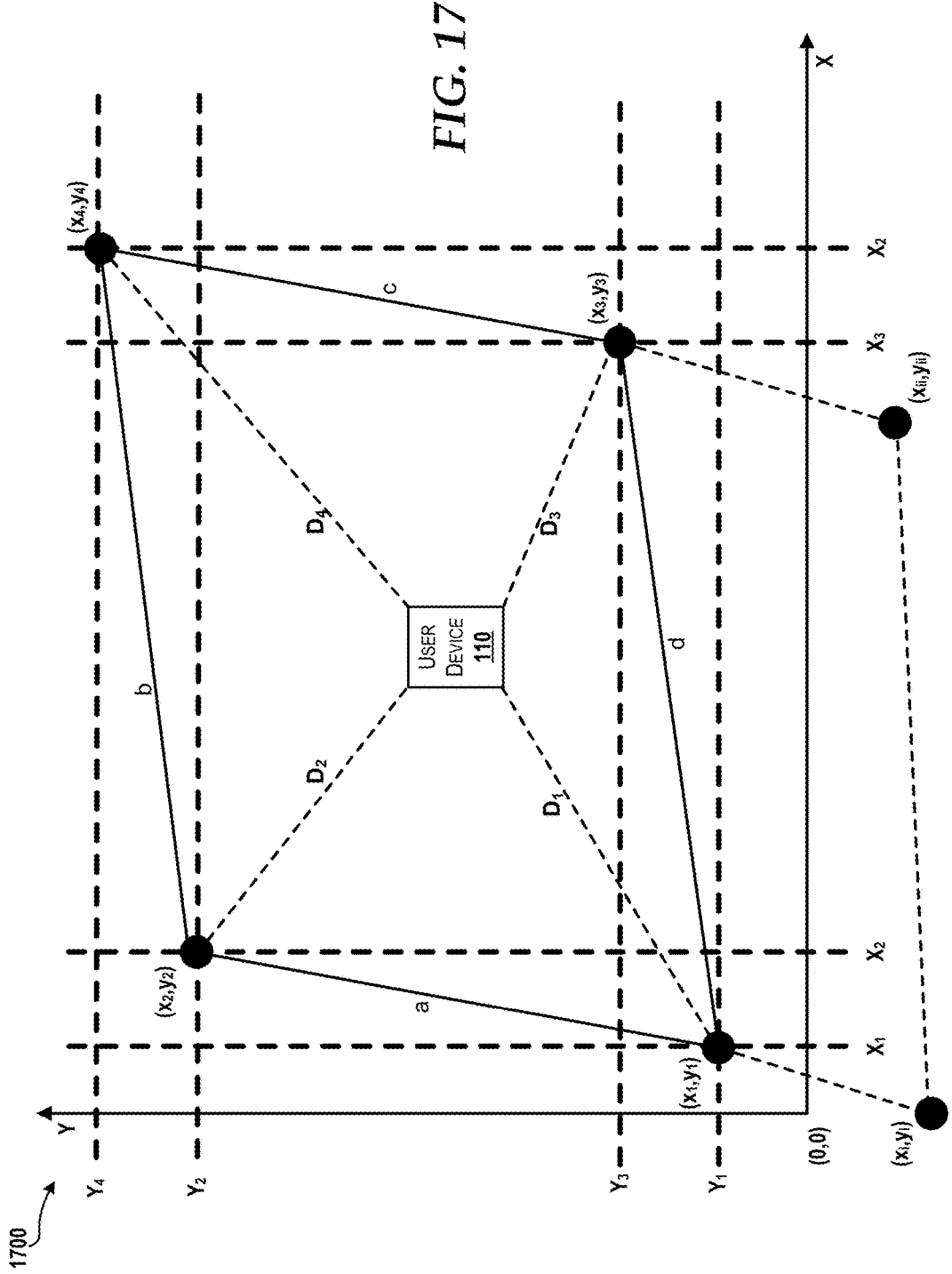
FIG. 17 is another graph illustrating a user device receiving signals from a plurality of beacons within an indoor environment for use in calculating coordinates of the user device, according to another illustrative embodiment.

Turning now to FIG. 17, another graph 1700 illustrating the user device 110 receiving the signals 1500A-1500D from the beacons 1502A-1502D for use in calculating coordinates of the user device 110 will be described, according to an illustrative embodiment. The graph 1700 shows an example in which the locations of the beacons do not fit into a rectangle with respect to the coordinate axis. The distances between the beacons, however, can still be calculated since the coordinate pairs $(x_1, y_1)$, $(x_2, y_2)$, $(x_3, y_3)$, and $(x_4, y_4)$ for the beacons are known (i.e., these coordinate pairs are predefined and recorded beacon coordinates stored in the environment database 120) using $a=\text{sqrt}[(x_2-x_1)^2+(y_2-y_3)^2]$. D1, D2, D3, and D4 are the distances from the beacon coordinate pairs to the user device 110. These distances are calculated from the measured RSSI as explained above.

For the sake of simplicity, and since the location of the user device 110 can be calculated approximately in reference to the four closest reference beacon coordinates, a method for calculating the location of the user device 110 may assume that a, b, c, and d form a rectangle. The error caused by this assumption is negligible.

Figure 18:
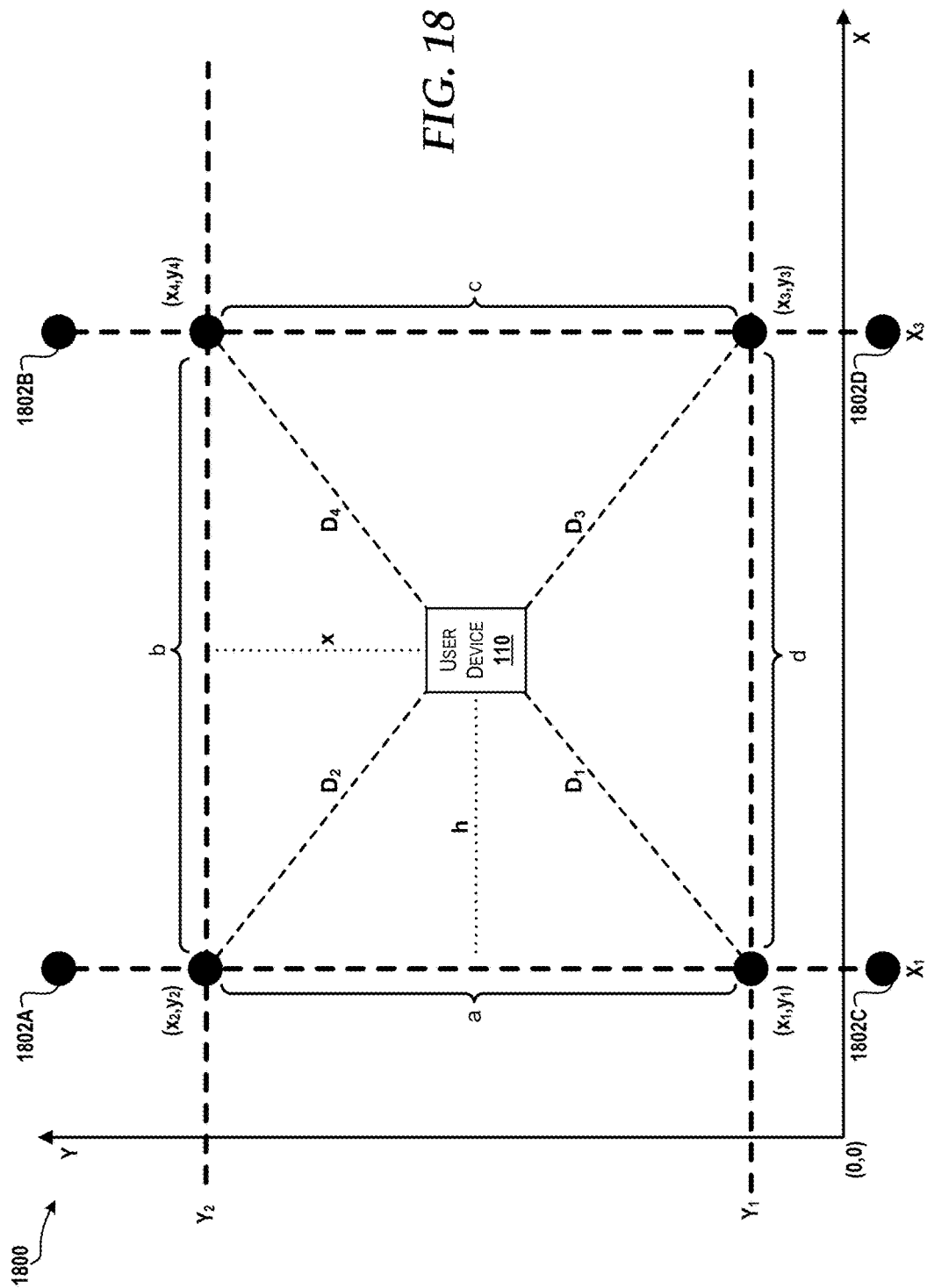
FIG. 18 is yet another graph illustrating a user device receiving signals from a plurality of beacons within an indoor environment for use in calculating coordinates of the user device, according to yet another illustrative embodiment.

Turning now to FIG. 18, another graph 1800 illustrating the user device 110 receiving the signals 1500A-1500D from the beacons 1502A-1502D for use in calculating coordinates of the user device 110 will be described, according to an illustrative embodiment. The coordinate pairs $(x_1, y_1)$, $(x_2, y_2)$, $(x_3, y_3)$, and $(x_4, y_4)$ are known (i.e., these coordinate pairs are predefined and recorded beacon coordinates stored in the environment database 120). D1, D2, D3, and D4 are the distances from the beacon coordinate pairs. These distances are calculated from the measured RSSI as explained above. After the coordinates are calculated using the closest beacons associated with the coordinate pairs $(x_1, y_1)$, $(x_2, y_2)$, another calculation can be made for the coordinate pairs $(x_3, y_3)$ and $(x_4, y_4)$. Similar calculations can be made for additional beacons 1802A-1802D. The X coordinate values and the Y coordinate values can be averaged for the sake of accuracy.

Figure 19:
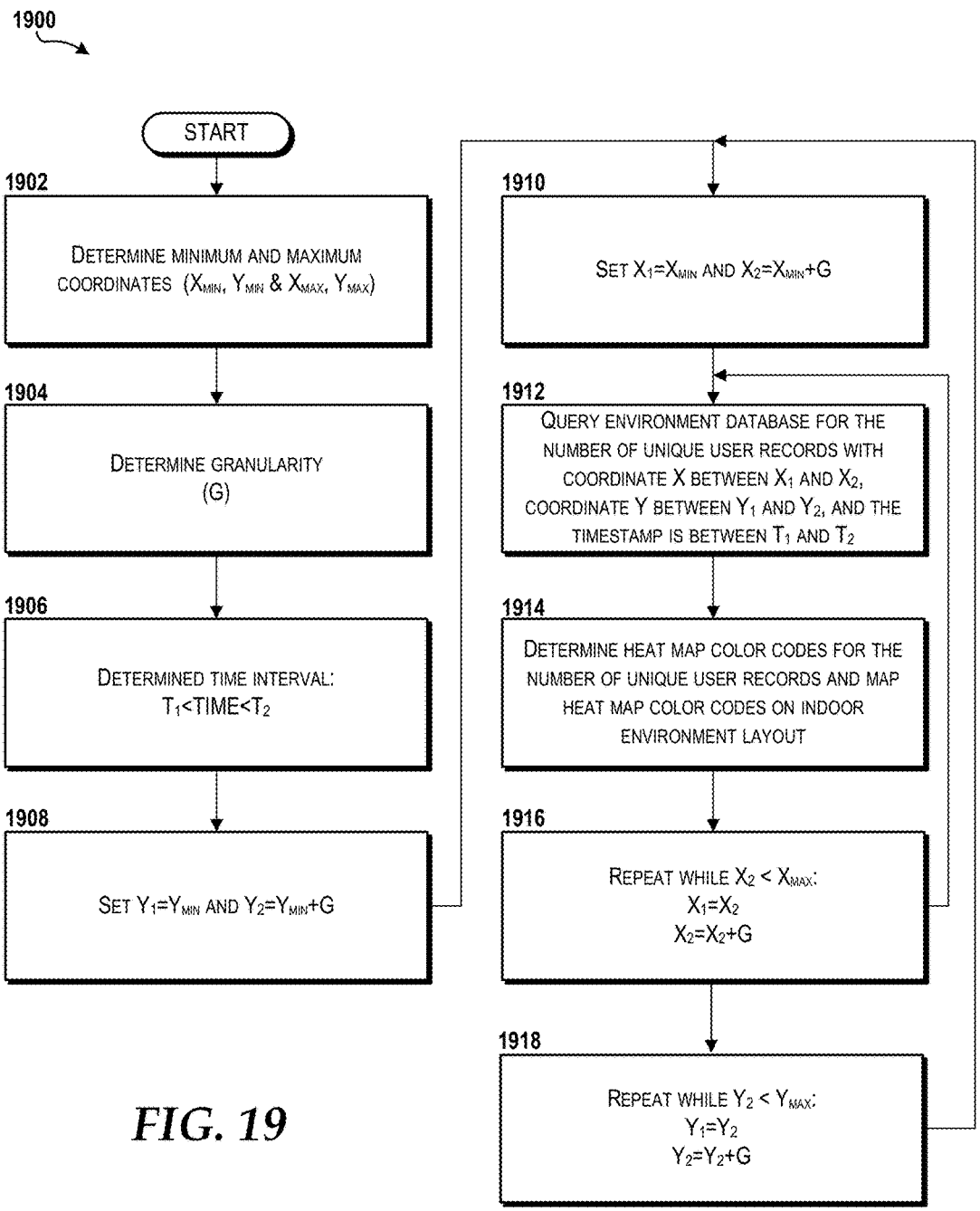
FIG. 19 is a flow diagram illustrating aspects of a method for calculating and displaying heat maps on a store layout, according to an illustrative embodiment.

Turning now to FIG. 19, a method 1900 for calculating and displaying heat maps on a store layout will be described, according to an illustrative embodiment. In some embodiments, one or more of the operations of the method 1900 are performed by the environment analytics system 118 in response to input from a user. In some other embodiments, one or more of operations of the method 1900 are automated by the environment analytics system 118 using machine learning algorithms and/or other techniques programmed into the analytics application 128.

The method 1900 begins and proceeds to operation 1902, where the environment analytics system 118 determines minimum and maximum coordinates $(X_{min}, Y_{min}$ and $X_{max}, Y_{max})$, which are used to determine the area to be analyzed. From operation 1902, the method proceeds to operation 1904, where the environment analytics system 118 determines a granularity to be used. The granularity is an increment used to calculate the size of each granular area inside the area to be analyzed. From operation 1904, the method 1900 proceeds to operation 1906, where the environment analytics system 118 determines a time interval. The time interval is used to specify the time during which the analysis is to be made.

From operation 1906, the method 1900 proceeds to operation 1908, where the environment analytics system 118 sets $Y_1=Y_{min}$ and $Y_2=Y_{min}+G$. From operation 1908, the method 1900 proceeds to operation 1910, where the environment analytics system 118 sets $X_1=X_{min}$ and $X_2=X_{min}+G$. The method 1900 then proceeds to operation 1912, where the environment analytics system 118 queries the environment database 120 for the number of unique user records with coordinate X between $X_1$ and $X_2$, coordinate Y between $Y_1$ and $Y_2$, and the timestamp is between $T_1$ and $T_2$.

From operation 1912, the method 1900 proceeds to operation 1914, where the environment analytics system 118 assigns a heat map color for each area based upon the number of unique user records. For example, if the number of unique users is 0, the heat map color may be white; for 1-10 unique users, the heat map color may be light yellow; for 11-50 users, the heat map color may be dark yellow; for 51-100 unique users, the heat map color may be orange; for 101-200 unique users, the heat map color may be brown; and for greater than 200 unique users, the heat map color may be red. These colors are provided as examples only and the actual number of unique users for each heat map color may be specified differently for different implementations of the concepts and technologies disclosed herein. An example heat map is shown in grayscale in FIG. 21.

Figure 20:
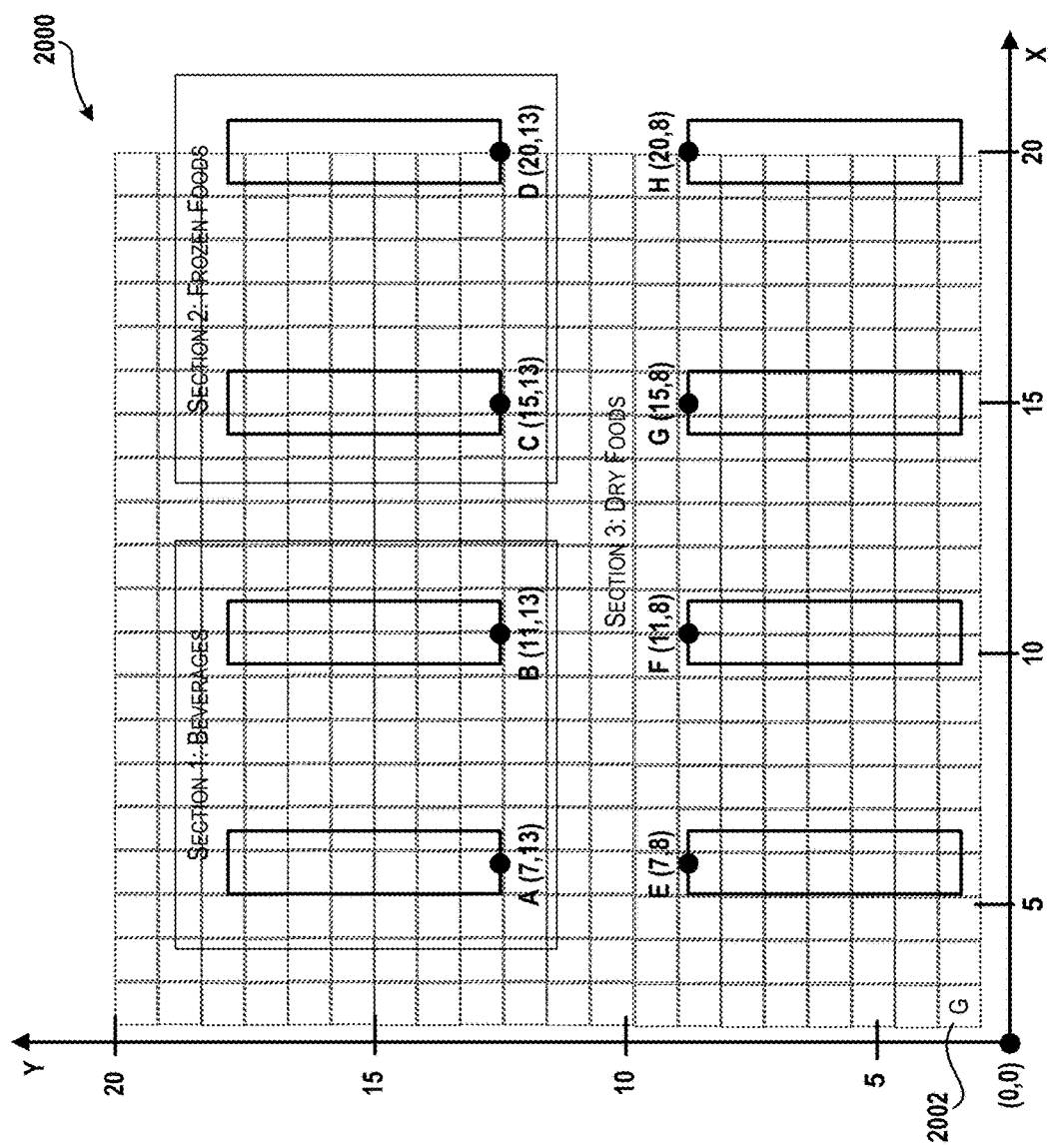
FIG. 20 is a graph illustrating a store layout on a two-dimensional coordinate system and a granularity ("G") used to calculate a heat map for a store layout, according to an illustrative embodiment.

From operation 1914, the method 1900 proceeds to operation 1916, where the environment analytics system 118 enters a first while loop. In particular, while $X_2<X_{max}$, $X_1$ is set equal to $X_2$ and $X_2$ is set equal to $X_2+G$ and operations 1912 and 1914 are repeated. From operation 1916, the operation 1900 proceeds to operation 1918, where the environment analytics system 118 enters a second while loop. In particular, while $Y_2<Y_{max}$, $Y_1$ is set equal to $Y_2$ and $Y_2$ is set equal to $Y_2+G$ and operations 1912, 1914 and 1916 are repeated. Turning now to FIG. 20, a graph 2000 illustrating a store layout on a two-dimensional coordinate system and a granularity ("G") 2002 used to calculate a heat map for a store layout is illustrated, according to an illustrative embodiment.

Figure 21:
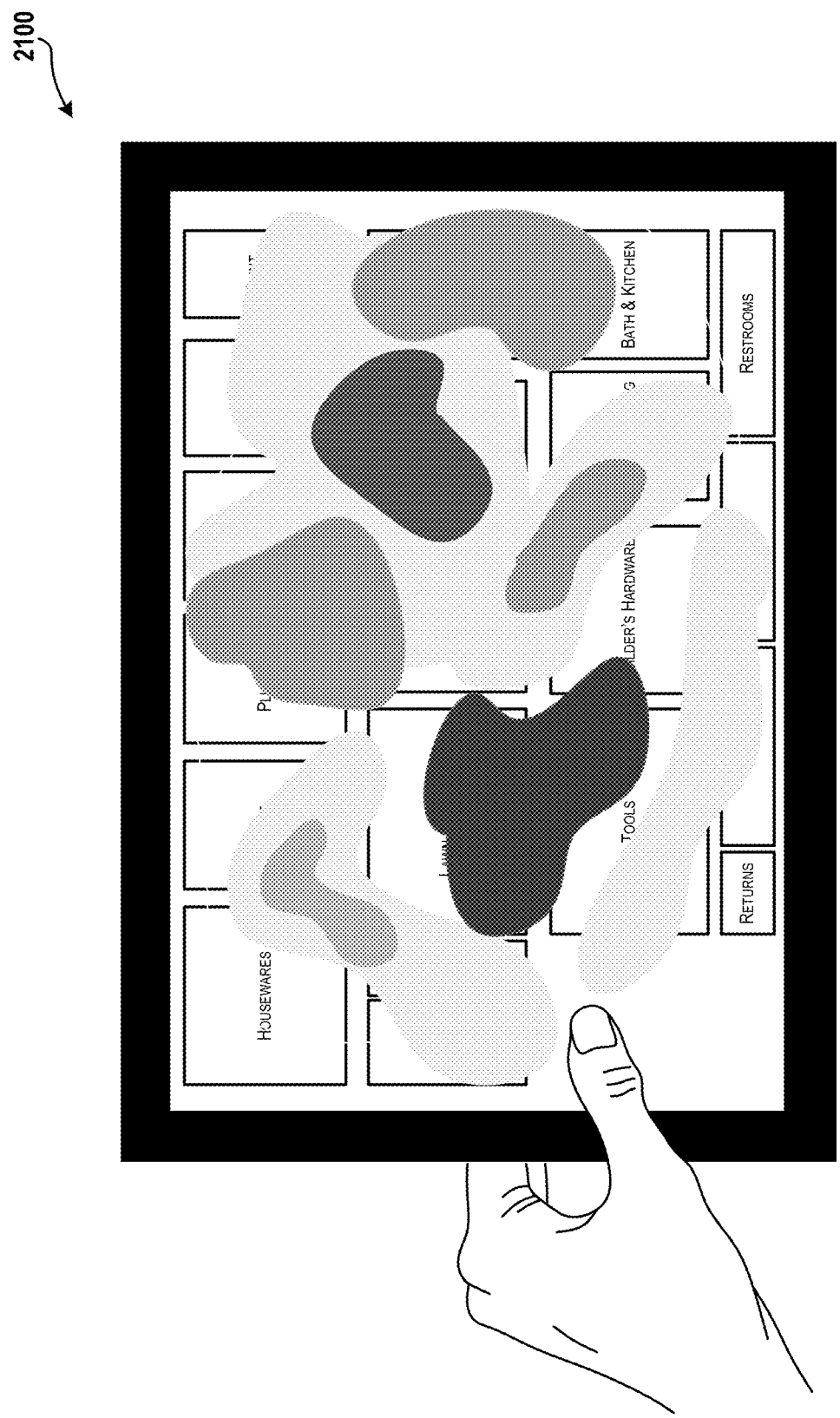
FIG. 21 is a user interface diagram illustrating an example heat map on an example store layout, according to an illustrative embodiment.

Turning now to FIG. 21, an example heat map 2100 on an example store layout is illustrated, according to an illustrative embodiment.

Figure 22:
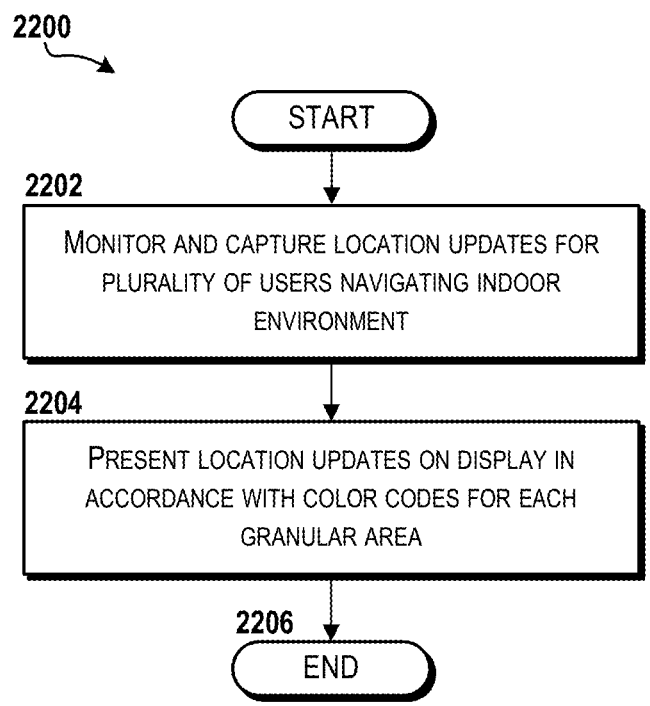
FIG. 22 is a flow diagram illustrating a method for determining location updates for a plurality of users and presenting the location updates on a store layout as a heat map, according to an illustrative embodiment.

Turning now to FIG. 22, a method 2200 for determining location updates for a plurality of users and presenting the location updates on a store layout as a heat map will be described, according to an illustrative embodiment. The method 2200 begins and proceeds to operation 2202, where the environment analytics system 118 monitors and captures location updates for a plurality of users navigating the indoor environment 102. From operation 2202, the method 2200 proceeds to operation 2204, where the environment analytics system 118 presents the location updates on a display in accordance with color codes associated with each granular area of the indoor environment 102. From operation 2204, the method 2000 proceeds to operation 2206, where the method 2200 ends. The method 2200 shows the location updates on the layout.

Figure 23:
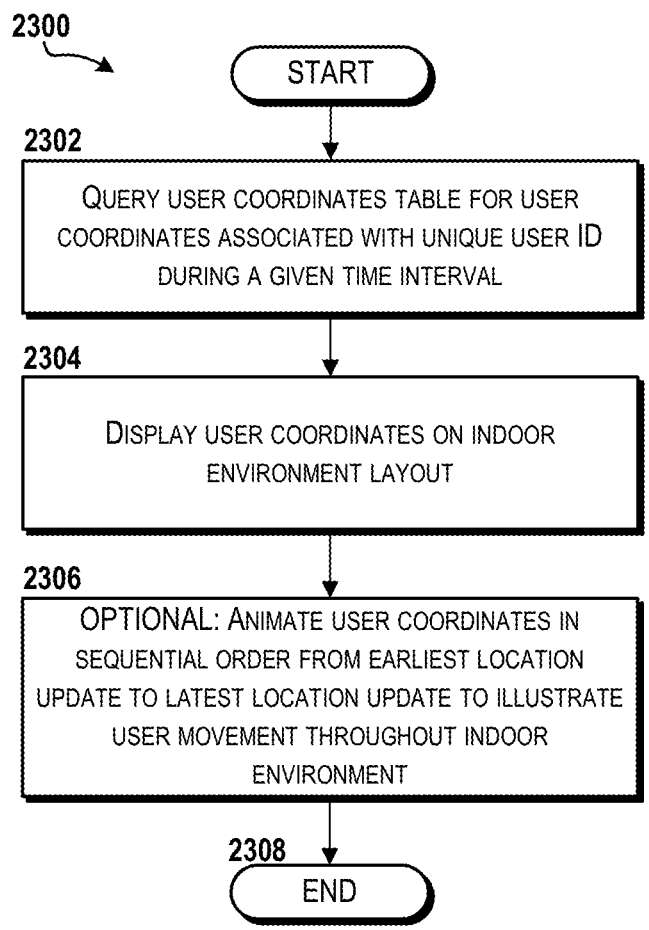
FIG. 23 is a flow diagram illustrating a method for determining a path navigated by a user within an indoor environment, according to an illustrative embodiment.

Turning now to FIG. 23, a method 2300 for determining a path navigated by the user 112 within the indoor environment 102 will be described, according to an illustrative embodiment. The method 2300 begins and proceeds to operation 2302, where the environment analytics system 118 queries a user coordinates table for user coordinate associated with a unique user ID during a given time interval. From operation 2302, the method 2300 proceeds to operation 2304, where the environment analytics system 118 presents the user coordinates on a layout of the indoor environment 102.

From operation 2304, the method 2300 proceeds to optional operation 2306, where the environment analytics system 118 animates the user coordinates in sequential order from earliest location update to latest location update to illustrate user movement throughout the indoor environment 102. From operation 2306, the method 2000 proceeds to operation 2308, where the method 2300 ends.

Figure 24:
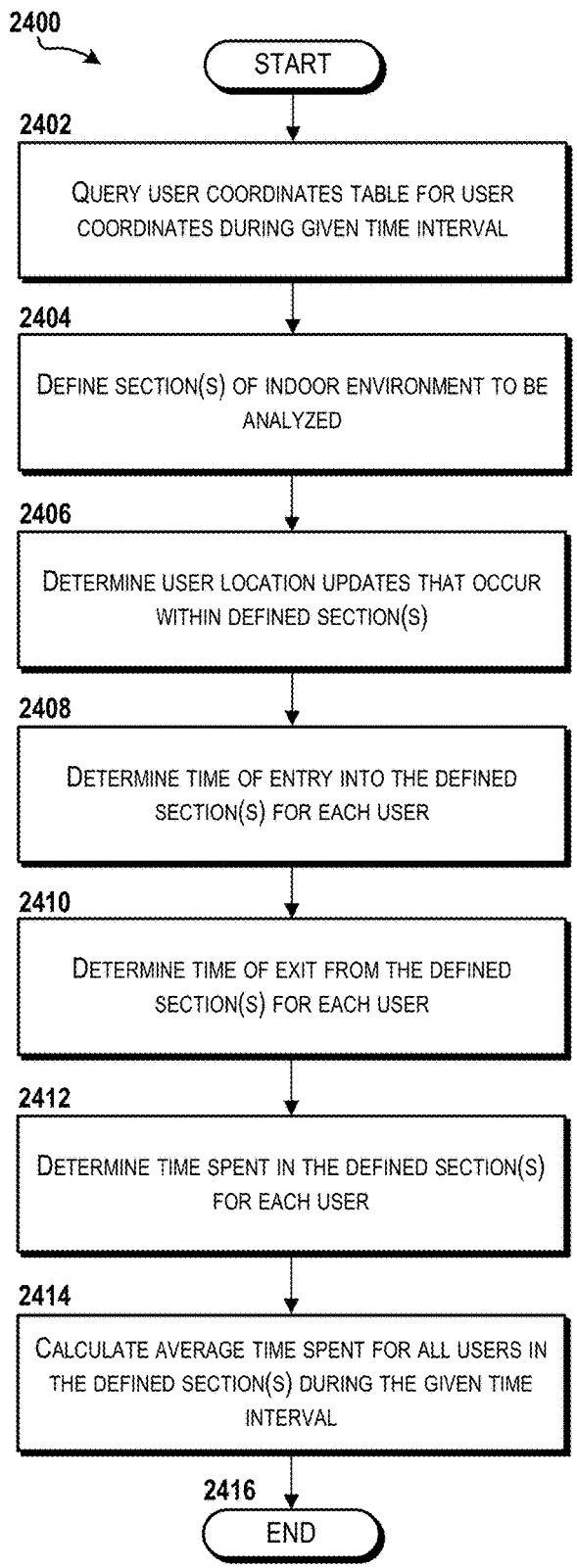
FIG. 24 is a flow diagram illustrating a method for determining an average time spent in a section of an indoor environment, according to an illustrative embodiment.

Turning now to FIG. 24, a method 2400 for determining an average time spent in a section of the indoor environment 102 will be described, according to an illustrative embodiment. The method 2400 begins and proceeds to operation 2402, where the environment analytics system 118 queries the user coordinates tables for user coordinates during a given time interval. From operation 2402, the method 2400 proceeds to operation 2404, where the environment analytics system 118 defines one or more sections of the indoor environment 102 to be analyzed.

From operation 2404, the method 2400 proceeds to operation 2406, where the environment analytics system 118 determines user location updates that occurred within the defined section(s). From operation 2406, the method 2400 proceeds to operation 2408, where the environment analytics system 118 determines the time of entry into the defined section(s) for each user. The method 2400 then proceeds to operation 2410, where the environment analytics system 118 determines the time of exit from the defined section(s) for each user. From operation 2400, the method 2400 proceeds to operation 2412, where the environment analytics system 118 determines the time spent in the defined section(s) for each user. From operation 2412, the method 2400 proceeds to operation 2414, where the environment analytics system 118 calculates the average time spent for all users in the defined section(s) during the given time interval.

From operation 2414, the method 2400 proceeds to operation 2416. The method 2400 ends at operation 2416.

Figure 25:
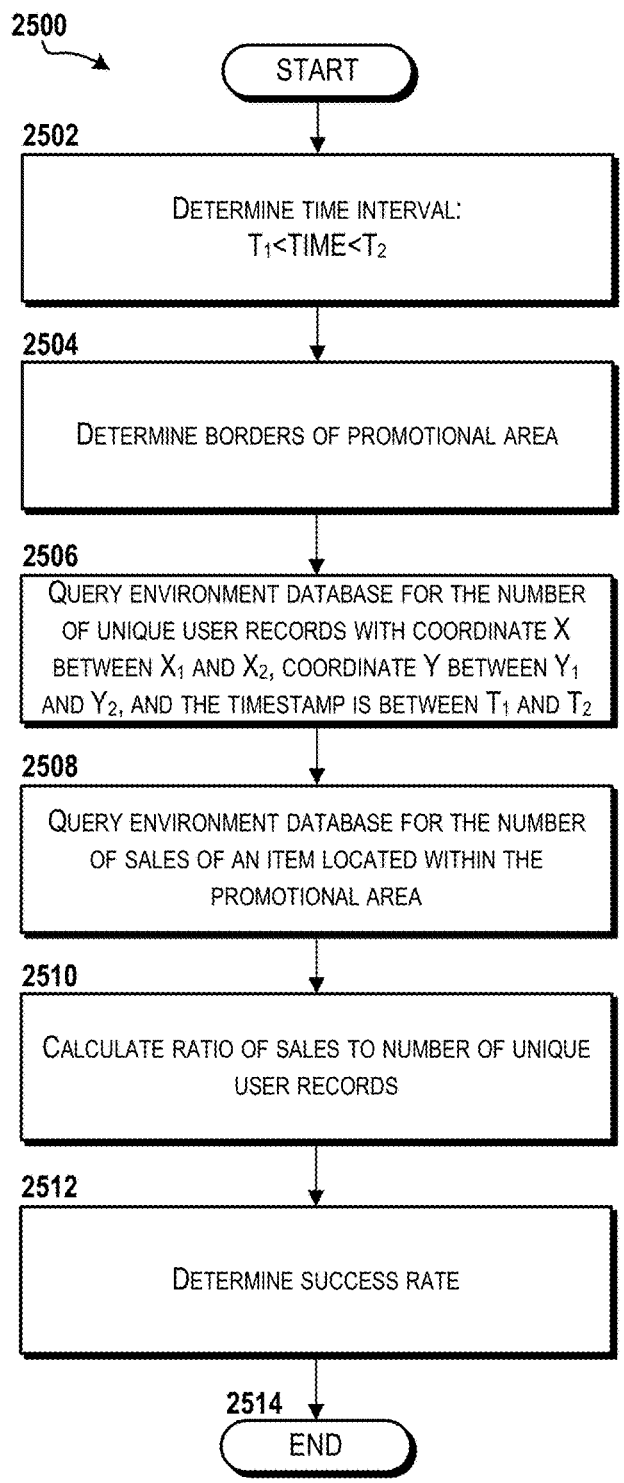
FIG. 25 is a flow diagram illustrating a method for determining a success rate of a promotional item within a store, according to an illustrative embodiment.

Turning now to FIG. 25, a method 2500 for determining a success rate of a promotional item within a store will be described, according to an illustrative embodiment. The method 2500 begins and proceeds to operation 2502, where the environment analytics system 118 determines a time interval during which to determine the success rate of the promotional item. From operation 2502, the method 2500 proceeds to operation 2504, where the environment analytics system 118 determines the borders of the promotional area in which the promotional item is located. The borders can be defined by multiple coordinate pairs obtained from the environment data 132 stored in the environment database 120.

From operation 2504, the method 2500 proceeds to operation 2506, where the environment analytics system 118 queries the environment database 120 for the number of unique user records with coordinate X between $X_1$ and $X_2$, coordinate Y between $Y_1$ and $Y_2$, and a timestamp within the time interval determined at operation 2502. From operation 2506, the method 2500 proceeds to operation 2508, where the environment coordinates system 118 queries the environment database 120 for the number of sales of the promotional item within the promotional area. The method 2500 then proceeds to operation 2510, where the environment analytics system 118 calculates a ratio of sales to the number of unique user records obtained at operation 2506. From operation 2510, the method 2500 proceeds to operation 2512, where the environment analytics system 118 determines the success rate of the promotional item based upon the ratio of sales to the number of unique records calculated at operation 2510.

From operation 2512, the method 2500 proceeds to operation 2514. The method 2500 ends at operation 2514.

Figure 26:
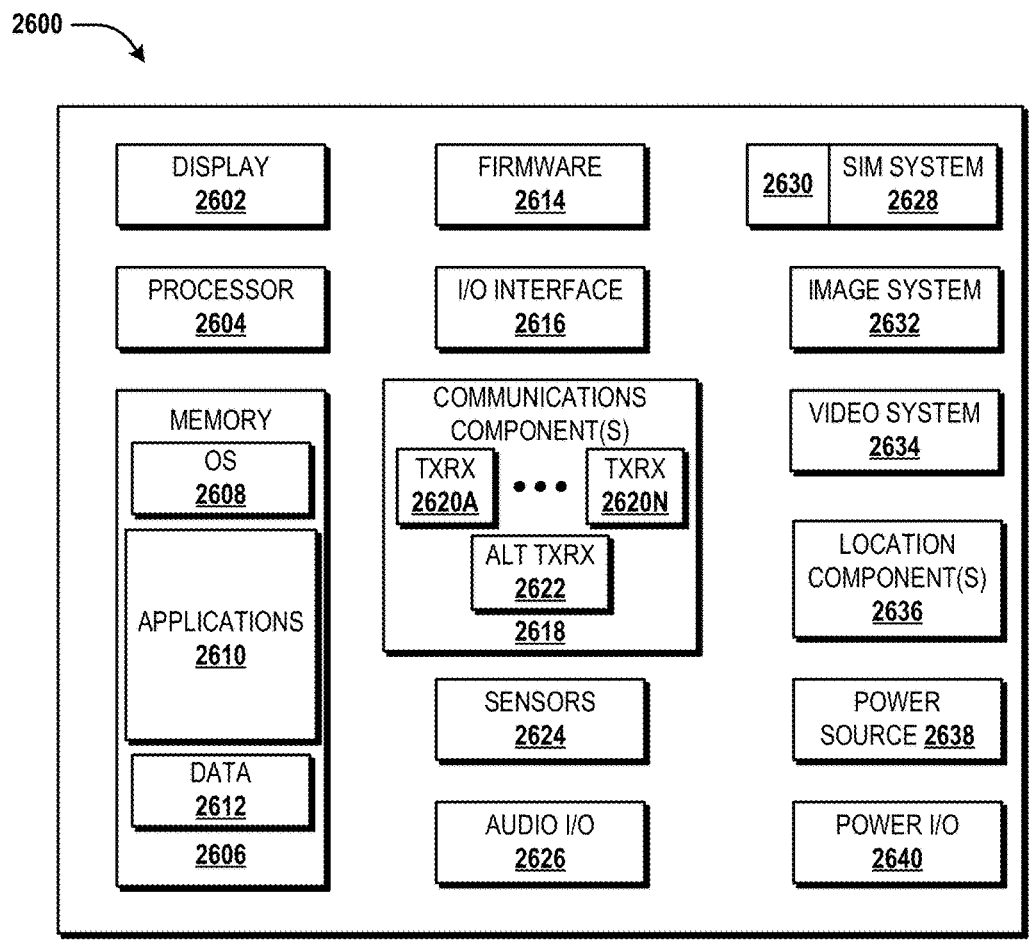
FIG. 26 schematically illustrates a network, according to an illustrative embodiment.

Turning now to FIG. 26, an illustrative mobile device 2600 and components thereof will be described. In some embodiments, the user device 110 described above, in part, with reference to FIG. 1 can be configured as and/or can have an architecture similar or identical to the mobile device 2600 described herein with respect to FIG. 26. It should be understood, however, that the user device 110 may or may not include the functionality described herein with reference to FIG. 26. While connections are not shown between the various components illustrated in FIG. 26, it should be understood that some, none, or all of the components illustrated in FIG. 26 can be configured to interact with one other to carry out various device functions. In some embodiments, the components are arranged so as to communicate via one or more busses (not shown). Thus, it should be understood that FIG. 26 and the following description are intended to provide a general understanding of a suitable environment in which various aspects of embodiments can be implemented, and should not be construed as being limiting in any way.

As illustrated in FIG. 26, the mobile device 2600 can include a display 2602 for displaying data. According to various embodiments, the display 2602 can be configured to display at least a portion of the environment data 132, at least a portion of the customer data 134, at least a portion of the product data 136, at least a portion of the promotion data 138, at least a portion of the beacon data 140, at least a portion of the heat map data 142, various graphical user interface ("GUI") elements such as the elements illustrated and described herein with reference to FIG. 12, text, images, video, virtual keypads and/or keyboards, messaging data, notification messages, metadata, internet content, device status, time, date, calendar data, device preferences, map and location data, combinations thereof, and/or the like. The mobile device 2600 also can include a processor 2604 and a memory or other data storage device ("memory") 2606. The processor 2604 can be configured to process data and/or can execute computer-executable instructions stored in the memory 2606. The computer-executable instructions executed by the processor 2604 can include, for example, an operating system 2608, one or more applications 2610 such as the application 128, other computer-executable instructions stored in a memory 2606, or the like. In some embodiments, the applications 2610 also can include a UI application (not illustrated in FIG. 26).

The UI application can interface with the operating system 2608 to facilitate user interaction with functionality and/or data stored at the mobile device 2600 and/or stored elsewhere, such as in the environment database 120. In some embodiments, the operating system 2608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 2604 to aid a user in interacting with at least a portion of the environment data 132, at least a portion of the customer data 134, at least a portion of the product data 136, at least a portion of the promotion data 138, at least a portion of the beacon data 140, at least a portion of the heat map data 142, and/or other data associated with the indoor environment, the environment analytics system 118, the network 116, and/or the other systems 122. The UI application can be executed by the processor 2604 to aid a user in answering/initiating calls, entering/deleting other data, entering and setting user IDs and passwords for device access, configuring settings, manipulating address book content and/or settings, multimode interaction, interacting with other applications 2610, and otherwise facilitating user interaction with the operating system 2608, the applications 2610, and/or other types or instances of data 2612 that can be stored at the mobile device 2600. The data 2612 can include, for example, at least a portion of the environment data 132, at least a portion of the customer data 134, at least a portion of the product data 136, at least a portion of the promotion data 138, at least a portion of the beacon data 140, at least a portion of the heat map data 142, and/or other applications or program modules. According to various embodiments, the data 2612 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 2610, the data 2612, and/or portions thereof can be stored in the memory 2606 and/or in a firmware 2614, and can be executed by the processor 2604. The firmware 2614 also can store code for execution during device power up and power down operations. It should be appreciated that the firmware 2614 can be stored in a volatile or non-volatile data storage device including, but not limited to, the memory 2606 and/or a portion thereof.

The mobile device 2600 also can include an input/output ("I/O") interface 2616. The I/O interface 2616 can be configured to support the input/output of data such at least a portion of the environment data 132, at least a portion of the customer data 134, at least a portion of the product data 136, at least a portion of the promotion data 138, at least a portion of the beacon data 140, at least a portion of the heat map data 142, presence status information, user IDs, passwords, and application initiation (start-up) requests. In some embodiments, the I/O interface 2616 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ411) port, an RJ11 port, a proprietary port, combinations thereof, or the like. In some embodiments, the mobile device 2600 can be configured to synchronize with another device to transfer content to and/or from the mobile device 2600. In some embodiments, the mobile device 2600 can be configured to receive updates to one or more of the applications 2610 via the I/O interface 2616, though this is not necessarily the case. In some embodiments, the I/O interface 2616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 2616 may be used for communications between the mobile device 2600 and a network device or local device.

The mobile device 2600 also can include a communications component 2618. The communications component 2618 can be configured to interface with the processor 2604 to facilitate wired and/or wireless communications with one or more networks such as the network 116 and one or more of the plurality of beacons 104A-104H described herein. In some embodiments, the communications component 2618 includes a multimode communications subsystem for facilitating communications via the cellular network and one or more other networks.

The communications component 2618, in some embodiments, includes one or more transceivers. The one or more transceivers, if included, can be configured to communicate over the same and/or different wireless technology standards with respect to one another. For example, in some embodiments one or more of the transceivers of the communications component 2618 may be configured to communicate using GSM, CDMAONE, CDMA2000, LTE, and various other 2G, 2.5G, 3G, 4G, and greater generation technology standards. Moreover, the communications component 2618 may facilitate communications over various channel access methods (which may or may not be used by the aforementioned standards) including, but not limited to, TDMA, FDMA, W-CDMA, OFDM, SDMA, and the like.

In addition, the communications component 2618 may facilitate data communications using GPRS, EDGE, the HSPA protocol family including HSDPA, EUL or otherwise termed HSUPA, HSPA+, and various other current and future wireless data access standards. In the illustrated embodiment, the communications component 2618 can include a first transceiver ("TxRx") 2620A that can operate in a first communications mode (e.g., GSM). The communications component 2618 also can include an $N^{th}$ transceiver ("TxRx") 2620N that can operate in a second communications mode relative to the first transceiver 2620A (e.g., UMTS). While two transceivers 2620A-N (hereinafter collectively and/or generically referred to as "transceivers 2620") are shown in FIG. 26, it should be appreciated that less than two, two, or more than two transceivers 2620 can be included in the communications component 2618.

The communications component 2618 also can include an alternative transceiver ("Alt TxRx") 2622 for supporting other types and/or standards of communications. According to various contemplated embodiments, the alternative transceiver 2622 can communicate using various communications technologies such as, for example, WI-FI, WIMAX, BLUETOOTH, BLE, infrared, infrared data association ("IRDA"), near field communications ("NFC"), other RF technologies, combinations thereof, and the like. As such, the alternative transceiver 2622 facilitates communications with one or more of the plurality of beacons 104A-104H.

In some embodiments, the communications component 2618 also can facilitate reception from terrestrial radio networks, digital satellite radio networks, internet-based radio service networks, combinations thereof, and the like. The communications component 2618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 2600 also can include one or more sensors 2624. The sensors 2624 can include temperature sensors, light sensors, air quality sensors, movement sensors, orientation sensors, noise sensors, proximity sensors, or the like. As such, it should be understood that the sensors 2624 can include, but are not limited to, accelerometers, magnetometers, gyroscopes, infrared sensors, noise sensors, microphones, combinations thereof, or the like. One or more of the sensors 2624 can be used to detect movement of the mobile device 2600. The movement can be compared to a threshold movement as described in FIG. 14. Additionally, audio capabilities for the mobile device 2600 may be provided by an audio I/O component 2626. The audio I/O component 2626 of the mobile device 2600 can include one or more speakers for the output of audio signals, one or more microphones for the collection and/or input of audio signals, and/or other audio input and/or output devices.

The illustrated mobile device 2600 also can include a subscriber identity module ("SIM") system 2628. The SIM system 2628 can include a universal SIM ("USIM"), a universal integrated circuit card ("UICC") and/or other identity devices. The SIM system 2628 can include and/or can be connected to or inserted into an interface such as a slot interface 2630. In some embodiments, the slot interface 2630 can be configured to accept insertion of other identity cards or modules for accessing various types of networks. Additionally, or alternatively, the slot interface 2630 can be configured to accept multiple subscriber identity cards. Because other devices and/or modules for identifying users and/or the mobile device 2600 are contemplated, it should be understood that these embodiments are illustrative, and should not be construed as being limiting in any way.

The mobile device 2600 also can include an image capture and processing system 2632 ("image system"). The image system 2632 can be configured to capture or otherwise obtain photos, videos, and/or other visual information. As such, the image system 2632 can include cameras, lenses, charge-coupled devices ("CCDs"), combinations thereof, or the like. The mobile device 2600 may also include a video system 2634. The video system 2634 can be configured to capture, process, record, modify, and/or store video content. Photos and videos obtained using the image system 2632 and the video system 2634, respectively, may be added as message content to an MMS message, email message, and sent to another mobile device. The video and/or photo content also can be shared with other devices via various types of data transfers via wired and/or wireless communication devices as described herein.

The mobile device 2600 also can include one or more location components 2636. The location components 2636 can be configured to send and/or receive signals to determine a geographic location of the mobile device 2600. According to various embodiments, the location components 2636 can send and/or receive signals from GPS devices, assisted-GPS ("A-GPS") devices, WI-FI/WIMAX and/or cellular network triangulation data, combinations thereof, and the like. The geographic location of the mobile device 2600 can be used, for example, as described in FIG. 13 if no beacons are detected. The location component 2636 also can be configured to communicate with the communications component 2618 to retrieve triangulation data for determining a location of the mobile device 2600. In some embodiments, the location component 2636 can interface with cellular network nodes, telephone lines, satellites, location transmitters and/or beacons, wireless network transmitters and receivers, combinations thereof, and the like. In some embodiments, the location component 2636 can include and/or can communicate with one or more of the sensors 2624 such as a compass, an accelerometer, and/or a gyroscope to determine the orientation of the mobile device 2600. Using the location component 2636, the mobile device 2600 can generate and/or receive data to identify its geographic location, or to transmit data used by other devices to determine the location of the mobile device 2600. The location component 2636 may include multiple components for determining the location and/or orientation of the mobile device 2600.

The illustrated mobile device 2600 also can include a power source 2638. The power source 2638 can include one or more batteries, power supplies, power cells, and/or other power subsystems including alternating current ("AC") and/or direct current ("DC") power devices. The power source 2638 also can interface with an external power system or charging equipment via a power I/O component 2640. Because the mobile device 2600 can include additional and/or alternative components, the above embodiment should be understood as being illustrative of one possible operating environment for various embodiments of the concepts and technologies described herein. The described embodiment of the mobile device 2600 is illustrative, and should not be construed as being limiting in any way.

Figure 27:
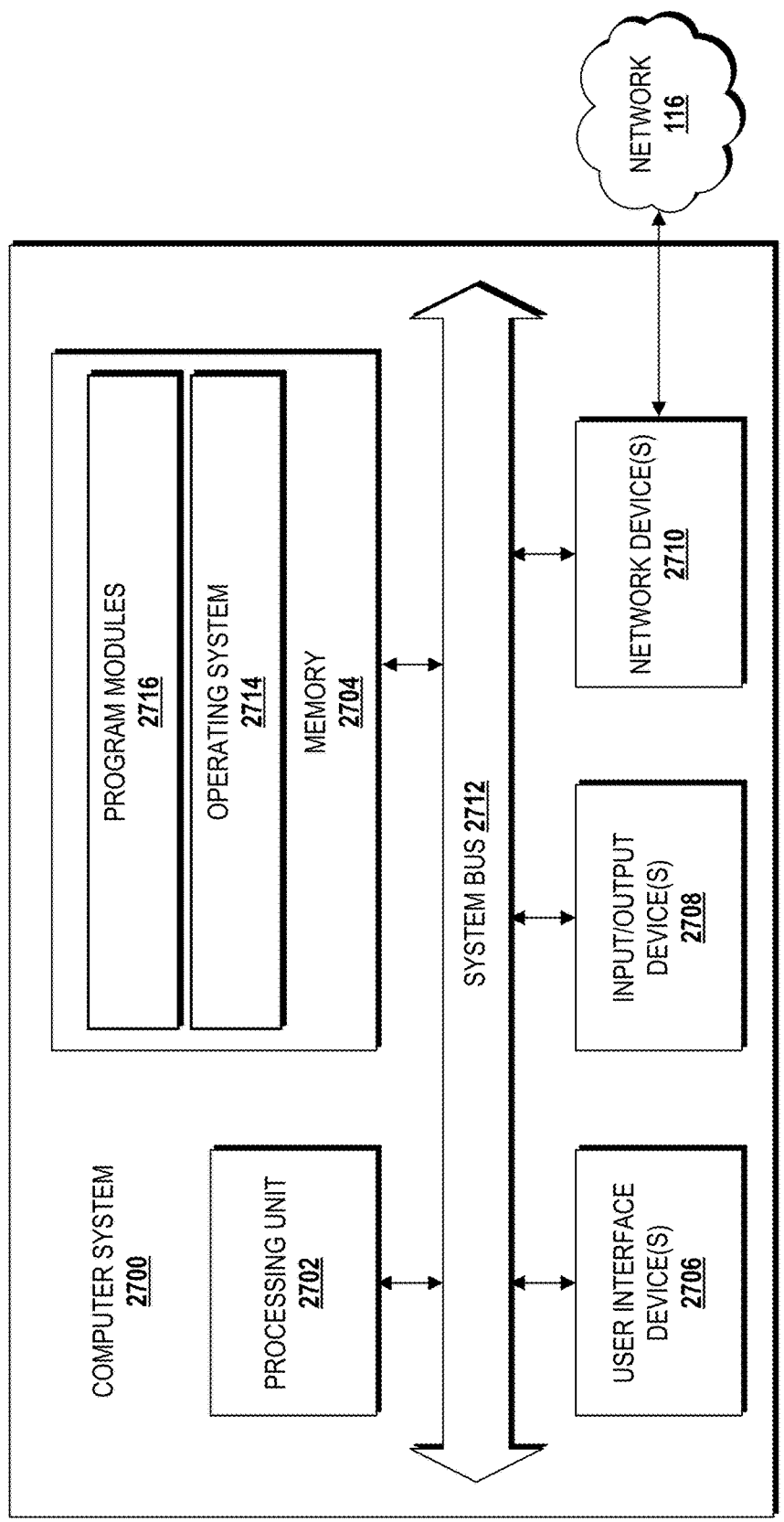
FIG. 27 is a block diagram illustrating an example computer system, according to some illustrative embodiments.

FIG. 27 is a block diagram illustrating a computer system 2700 configured to provide the functionality described herein for determining the indoor location of devices using reference points and sensors, in accordance with various embodiments of the concepts and technologies disclosed herein. In some embodiments, the environment analytics system 118 and/or one or more of the other systems 122 can be configured as and/or can have an architecture similar or identical to the computer system 2700 described herein with respect to FIG. 27. It should be understood, however, that the user device 110 may or may not include the functionality described herein with reference to FIG. 26.

The computer system 2700 includes a processing unit 2702, a memory 2704, one or more user interface devices 2706, one or more input/output ("I/O") devices 2708, and one or more network devices 2710, each of which is operatively connected to a system bus 2712. The bus 2712 enables bi-directional communication between the processing unit 2702, the memory 2704, the user interface devices 2706, the I/O devices 2708, and the network devices 2710.

The processing unit 2702 may be a standard central processor that performs arithmetic and logical operations, a more specific purpose programmable logic controller ("PLC"), a programmable gate array, or other type of processor known to those skilled in the art and suitable for controlling the operation of the computer system 2700. Processing units are generally known, and therefore are not described in further detail herein.

The memory 2704 communicates with the processing unit 2702 via the system bus 2712. In some embodiments, the memory 2704 is operatively connected to a memory controller (not shown) that enables communication with the processing unit 2702 via the system bus 2712. The memory 2704 includes an operating system 2714 and one or more program modules 2716. The operating system 2714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 2716 may include various software and/or program modules described herein. In some embodiments, for example, the program modules 2716 include the analytics application 130. The analytics application 130 and/or other software programs can be embodied in computer-readable media containing instructions that, when executed by the processing unit 2702, perform at least a portion of one or more of the methods 600, 800, 1900, 2200, 2300, 2400, 2500 described in detail above with respect to FIGS. 6, 8, 19, 22, 23, and 25. According to embodiments, the program modules 2716 may be embodied in hardware, software, firmware, or any combination thereof. Although not shown in FIG. 27, it should be understood that the memory 2704 also can be configured to store all or a portion of the environment database 120 and/or other data, if desired.

By way of example, and not limitation, computer-readable media may include any available computer storage media or communication media that can be accessed by the computer system 2700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 2700. In the claims, the phrase "computer storage medium" and variations thereof does not include waves or signals per se and/or communication media.

The user interface devices 2706 may include one or more devices with which a user accesses the computer system 2700. The user interface devices 2706 may include, but are not limited to, computers, servers, personal digital assistants, cellular phones, or any suitable computing devices. The I/O devices 2708 enable a user to interface with the program modules 2716. In one embodiment, the I/O devices 2708 are operatively connected to an I/O controller (not shown) that enables communication with the processing unit 2702 via the system bus 2712. The I/O devices 2708 may include one or more input devices, such as, but not limited to, a keyboard, a mouse, or an electronic stylus. Further, the I/O devices 2708 may include one or more output devices, such as, but not limited to, a display screen or a printer to output data such as the data stored in the environment database 120 in the form of text, numbers, characters, maps, other visualizations, and the like.

The network devices 2710 enable the computer system 2700 to communicate with other networks or remote systems via a network, such as the network 116. Examples of the network devices 2710 include, but are not limited to, a modem, a radio frequency ("RF") or infrared ("IR") transceiver, a telephonic interface, a bridge, a router, or a network card. The network 104 may include a wireless network such as, but not limited to, a WLAN such as a WI-FI network, a WWAN, a Wireless Personal Area Network ("WPAN") such as BLUETOOTH, a WMAN such a WiMAX network, or a cellular network. Alternatively, the network 104 may be a wired network such as, but not limited to, a WAN such as the Internet, a LAN, a wired PAN, or a wired MAN.

Figure 28:
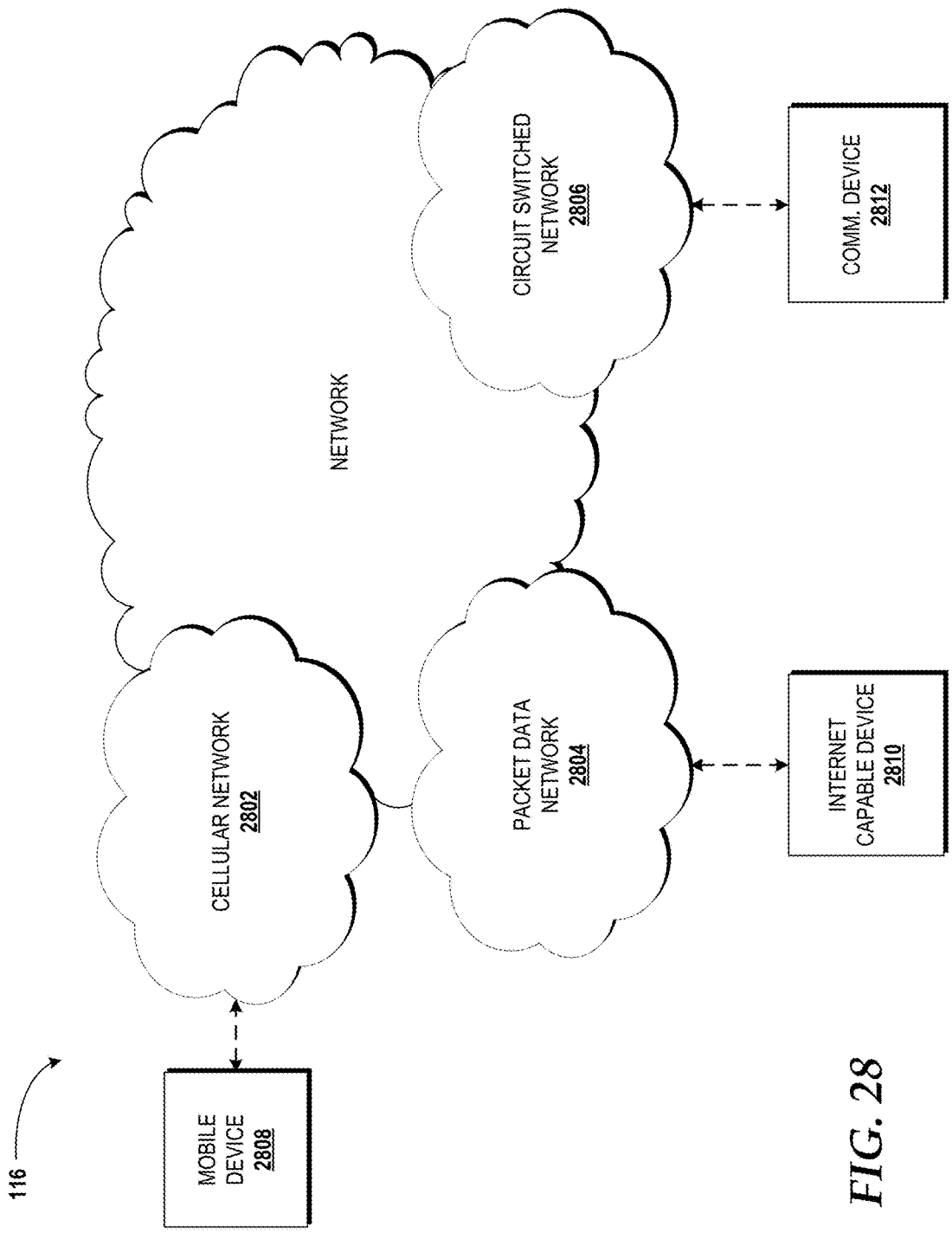
FIG. 28 is a block diagram illustrating an example mobile device, according to some illustrative embodiments.

Turning now to FIG. 28, additional details of an embodiment of the network 116 are illustrated, according to an illustrative embodiment. The network 116 includes a cellular network 2802, a packet data network 2804, for example, the Internet, and a circuit switched network 2806, for example, a publicly switched telephone network ("PSTN"). The cellular network 2802 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 2802 also includes radios and nodes for receiving and transmitting voice, data, and combinations thereof to and from radio transceivers, networks, the packet data network 2804, and the circuit switched network 2806.

A mobile communications device 2808, such as, for example, the user device 110, a cellular telephone, a user equipment, a mobile terminal, a PDA, a laptop computer, a handheld computer, and combinations thereof, can be operatively connected to the cellular network 2802. The cellular network 2802 can be configured as a 2G GSM network and can provide data communications via GPRS and/or EDGE. Additionally, or alternatively, the cellular network 2802 can be configured as a 3G UMTS network and can provide data communications via the HSPA protocol family, for example, HSDPA, EUL (also referred to as HSUPA), and HSPA+. The cellular network 2802 also is compatible with 4G mobile communications standards as well as evolved and future mobile standards.

The packet data network 2804 includes various devices, for example, servers, computers, databases, and other devices in communication with another, as is generally known. The packet data network 2804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 2804 includes or is in communication with the Internet. The circuit switched network 2806 includes various hardware and software for providing circuit switched communications. The circuit switched network 2806 may include, or may be, what is often referred to as a plain old telephone system ("POTS"). The functionality of a circuit switched network 2806 or other circuit-switched network are generally known and will not be described herein in detail.

The illustrated cellular network 2802 is shown in communication with the packet data network 2804 and a circuit switched network 2806, though it should be appreciated that this is not necessarily the case. One or more Internet-capable devices 2810, for example, a personal computer ("PC"), a laptop, a portable device, or another suitable device, can communicate with one or more cellular networks 2802, and devices connected thereto, through the packet data network 2804. It also should be appreciated that the Internet-capable device 2810 can communicate with the packet data network 2804 through the circuit switched network 2806, the cellular network 2802, and/or via other networks (not illustrated).

As illustrated, a communications device 2812, for example, a telephone, facsimile machine, modem, computer, or the like, can be in communication with the circuit switched network 2806, and therethrough to the packet data network 2804 and/or the cellular network 2802. It should be appreciated that the communications device 2812 can be an Internet-capable device, and can be substantially similar to the Internet-capable device 2810. In the specification, the network 104 is used to refer broadly to any combination of the networks 2802, 2804, 2806. It should be appreciated that substantially all of the functionality described with reference to the network 104 can be performed by the cellular network 2802, the packet data network 2804, and/or the circuit switched network 2806, alone or in combination with other networks, network elements, and the like.

Based on the foregoing, it should be appreciated that systems and methods for determining the indoor location of devices using reference points and sensors have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. A method comprising:
    retrieving, by an environment analytics system comprising a processor, a layout of an environment;
    determining, by the environment analytics system, an absolute reference point for the layout of the environment;
    determining, by the environment analytics system, a coordinate pair for a point associated with an area of the layout, the coordinate pair for the point associated with the area of the layout being determined relative to the absolute reference point;
    determining, by the environment analytics system, borders of a promotional area within the layout, the promotional area being associated with a plurality of beacons that define the borders of the promotional area;
    querying, by the environment analytics system, an environment database for a number of unique user location records within the borders of the promotional area;
    querying, by the environment analytics system, the environment database for a number of sales of an item located within the promotional area;
    calculating, by the environment analytics system, a ratio of sales to the number of unique user location records; and
    determining, by the environment analytics system, based at least in part on the ratio, a success rate of a promotion associated with the item.

2. The method of claim 1, wherein retrieving the layout of the environment comprises retrieving the layout from the environment database.

3. The method of claim 2, wherein the environment database is associated with the environment.

4. The method of claim 3, wherein the environment database is associated with a further environment.

5. The method of claim 2, further comprising updating environment data stored in the environment database to include the absolute reference point and the coordinate pair for the point associated with the area of the layout.

6. The method of claim 5, further comprising:
    determining a coordinate pair for a beacon deployed within the environment within the area;
    associating the coordinate pair for the beacon with a unique address of the beacon; and
    updating beacon data stored in the environment database to include the coordinate pair for the beacon and the unique address of the beacon.

7. The method of claim 6, further comprising:
    receiving calibration data from a user device, the calibration data comprising a distance value, a signal strength value, and the unique address of the beacon, the distance value being calculated by the user device from the signal strength value of a signal sent by the beacon and received by the user device, and the distance value indicating a distance of the user device from the beacon; and
    updating the beacon data stored in the environment database to include the calibration data in association with the beacon and a specification of the user device;
    wherein the beacon data is useable by a further user device that also has the specification to calculate a location of the further user device within the environment.

8. The method of claim 1, further comprising:
    applying a coordinate system to the layout of the environment, the coordinate system comprising the absolute reference point;
    determining a minimum coordinate pair and a maximum coordinate pair;
    determining a granularity;
    determining a time interval;
    setting a first coordinate equal to a first minimum coordinate of the minimum coordinate pair;
    setting a second coordinate equal to a second minimum coordinate of the minimum coordinate pair;
    setting a third coordinate equal to a sum of the first minimum coordinate and the granularity;
    setting a fourth coordinate equal to a sum of the second minimum coordinate and the granularity;
    querying the environment database for a number of unique user location records with a first location coordinate between the first coordinate and the third coordinate, a second location coordinate between the second coordinate and the fourth coordinate, and a timestamp within the time interval;
    determining heat map color codes for a plurality of different numbers of unique user location records; and
    generating a heat map comprising a plurality of areas representing at least a portion of the heat map color codes.

9. The method of claim 1, further comprising:
querying a user coordinates table stored in the environment database for user coordinates associated with users located within the environment during a given time interval;
defining a section of the layout of the environment to be analyzed;
determining user location updates that occur within the section;
determining a time of entry into the section for each user associated with at least one of the user location updates;
determining a time of exit from the section for each user associated with at least one of the user location updates;
determining, based upon the time of entry and the time of exit for each user associated with at least one of the user location updates, a time spent in the section for each user; and
calculating an average time spent by averaging the time spent in the section for each user during the given time interval.

10. A system comprising:
a processor; and
a memory storing computer-executable instructions that, when executed by the processor, cause the processor to perform operations comprising
retrieving a layout of an environment,
determining an absolute reference point for the layout of the environment,
determining a coordinate pair for a point associated with an area of the layout, the coordinate pair for the point associated with the area of the layout being determined relative to the absolute reference point,
determining borders of a promotional area within the layout, the promotional area being associated with a plurality of beacons that define the borders of the promotional area;
querying an environment database for a number of unique user location records within the borders of the promotional area;
querying the environment database for a number of sales of an item located within the promotional area;
calculating a ratio of sales to the number of unique user location records; and
determining, based at least in part on the ratio, a success rate of a promotion associated with the item.

11. The system of claim 10, wherein retrieving the layout of the environment comprises retrieving the layout from the environment database.

12. The system of claim 11, wherein the operations further comprise updating environment data stored in the environment database to include the absolute reference point and the coordinate pair for the point associated with the area of the layout.

13. The system of claim 12, wherein the operations further comprise:
determining a coordinate pair for a beacon deployed within the environment within the area;
associating the coordinate pair for the beacon with a unique address of the beacon; and
updating beacon data stored in the environment database to include the coordinate pair for the beacon and the unique address of the beacon.

14. The system of claim 13, wherein the operations further comprise:
receiving calibration data from a user device, the calibration data comprising a distance value, a signal strength value, and the unique address of the beacon, the distance value being calculated by the user device from the signal strength value of a signal sent by the beacon and received by the user device, and the distance value indicating a distance of the user device from the beacon; and
updating the beacon data stored in the environment database to include the calibration data in association with the beacon and a specification of the user device;
wherein the beacon data is useable by a further user device that also has the specification to calculate a location of the further user device within the environment.

15. The system of claim 10, wherein the operations further comprise:
applying a coordinate system to the layout of the environment, the coordinate system comprising the absolute reference point;
determining a minimum coordinate pair and a maximum coordinate pair;
determining a granularity;
determining a time interval;
setting a first coordinate equal to a first minimum coordinate of the minimum coordinate pair;
setting a second coordinate equal to a second minimum coordinate of the minimum coordinate pair;
setting a third coordinate equal to a sum of the first minimum coordinate and the granularity;
setting a fourth coordinate equal to a sum of the second minimum coordinate and the granularity;
querying the environment database for a number of unique user location records with a first location coordinate between the first coordinate and the third coordinate, a second location coordinate between the second coordinate and the fourth coordinate, and a timestamp within the time interval;
determining heat map color codes for a plurality of different numbers of unique user location records; and
generating a heat map comprising a plurality of areas representing at least a portion of the heat map color codes.

16. The system of claim 10, wherein the operations further comprise:
querying a user coordinates table stored in the environment database for user coordinates associated with users located within the environment during a given time interval;
defining a section of the layout of the environment to be analyzed;
determining user location updates that occur within the section;
determining a time of entry into the section for each user associated with at least one of the user location updates;
determining a time of exit from the section for each user associated with at least one of the user location updates;
determining, based upon the time of entry and the time of exit for each user associated with at least one of the user location updates, a time spent in the section for each user; and
calculating an average time spent by averaging the time spent in the section for each user during the given time interval.

17. The computer storage medium of claim 16, wherein retrieving the layout of the environment comprises retrieving the layout from the environment database.

18. The computer storage medium of claim 17, wherein the operations further comprise updating environment data stored in the environment database to include the absolute reference point and the coordinate pair for the point associated with the area of the layout.

19. The computer storage medium of claim 18, wherein the operations further comprise:
   determining a coordinate pair for a beacon deployed within the environment within the area;
   associating the coordinate pair for the beacon with a unique address of the beacon; and
   updating beacon data stored in the environment database to include the coordinate pair for the beacon and the unique address of the beacon.

20. A computer storage medium having computer-executable instructions stored thereon that, when executed by a processor, cause the processor to perform operations comprising:
   retrieving a layout of an environment;
   determining an absolute reference point for the layout of the environment;
   determining a coordinate pair for a point associated with an area of the layout, the coordinate pair for the point associated with the area of the layout being determined relative to the absolute reference point;
   determining borders of a promotional area within the layout, the promotional area being associated with a plurality of beacons that define the borders of the promotional area;
   querying an environment database for a number of unique user location records within the borders of the promotional area;
   querying the environment database for a number of sales of an item located within the promotional area;
   calculating a ratio of sales to the number of unique user location records; and
   determining, based at least in part on the ratio, a success rate of a promotion associated with the item.

* * * * *